United States Patent
Hino

(10) Patent No.: US 10,434,859 B2
(45) Date of Patent: Oct. 8, 2019

(54) VEHICLE AND ENGINE GENERATOR UNIT FOR DRIVING VEHICLE

(71) Applicant: YAMAHA HATSUDOKI KABUSHIKI KAISHA, Iwata-shi, Shizuoka (JP)

(72) Inventor: Haruyoshi Hino, Iwata (JP)

(73) Assignee: YAMAHA HATSUDOKI KABUSHIKI KAISHA, Iwata-Shi, Shizuoka (JP)

( * ) Notice: Subject to any disclaimer, the term of this patent is extended or adjusted under 35 U.S.C. 154(b) by 0 days.

(21) Appl. No.: 15/603,565

(22) Filed: May 24, 2017

(65) Prior Publication Data
US 2017/0256106 A1 Sep. 7, 2017

Related U.S. Application Data

(63) Continuation-in-part of application No. PCT/JP2015/082932, filed on Nov. 24, 2015.

(30) Foreign Application Priority Data

Nov. 25, 2014 (JP) .................................. 2014-237372
Oct. 2, 2015 (JP) .................................. 2015-196667
(Continued)

(51) Int. Cl.
*B60K 1/02* (2006.01)
*H02K 21/24* (2006.01)
(Continued)

(52) U.S. Cl.
CPC .................. *B60K 1/02* (2013.01); *B60K 1/00* (2013.01); *B60K 6/20* (2013.01); *B60K 6/26* (2013.01);
(Continued)

(58) Field of Classification Search
CPC ...... G07C 5/006; G07C 5/008; G07C 5/0825; B60W 2710/083; B60W 20/50;
(Continued)

(56) References Cited

U.S. PATENT DOCUMENTS 3,229,138 A 1/1966 Kober
5,763,977 A 6/1998 Shimasaki et al.
(Continued)

FOREIGN PATENT DOCUMENTS

CN 1762086 A 4/2006
CN 1836962 A 9/2006
(Continued)

*Primary Examiner* — Atul Trivedi
(74) *Attorney, Agent, or Firm* — Rabin & Berdo, P.C.

(57) ABSTRACT

A vehicle includes a vehicle body, an electromotive driving unit mounted on the vehicle body, an engine operable with a liquid fuel, a generator that generates electric power, and a control device including a power generation control unit and an electric power output unit. The power generation control unit outputs a signal for controlling the engine and the generator, the electric power output unit outputting electric power generated by the generator to the electromotive driving unit. The control device in combination with the engine and the generator constitutes a physically integrated unit that is mountable to and dismountable from the vehicle body. The control device is configured to output a store visit promotion signal to an informing device while the physically integrated unit is mounted on the vehicle body, to prompt a visit to a store where the physically integrated unit is replaceable.

12 Claims, 14 Drawing Sheets

(30) Foreign Application Priority Data

| Oct. 2, 2015 | (JP) | 2015-196668 |
|---|---|---|
| Oct. 2, 2015 | (JP) | 2015-196669 |
| Oct. 2, 2015 | (JP) | 2015-196670 |

(51) Int. Cl.

| H02P 9/04 | (2006.01) |
|---|---|
| H02K 1/27 | (2006.01) |
| H02K 21/02 | (2006.01) |
| H02P 9/40 | (2006.01) |
| H02M 7/44 | (2006.01) |
| H02P 9/14 | (2006.01) |
| B60K 1/00 | (2006.01) |
| B60K 6/20 | (2007.10) |
| B60K 6/26 | (2007.10) |
| B60W 20/50 | (2016.01) |
| G07C 5/00 | (2006.01) |
| G07C 5/08 | (2006.01) |
| H02K 7/18 | (2006.01) |
| B60W 20/19 | (2016.01) |
| B60W 10/06 | (2006.01) |
| B60W 10/08 | (2006.01) |
| B60W 20/00 | (2016.01) |
| H02K 7/00 | (2006.01) |
| B60L 50/10 | (2019.01) |
| B60L 50/13 | (2019.01) |
| B60L 50/14 | (2019.01) |
| B60L 50/61 | (2019.01) |
| H02P 101/25 | (2016.01) |
| B60K 6/24 | (2007.10) |
| B60K 6/48 | (2007.10) |
| H02P 101/45 | (2016.01) |
| B60K 6/34 | (2007.10) |
| B60K 6/46 | (2007.10) |
| H02P 27/06 | (2006.01) |

(52) U.S. Cl.
CPC ............ *B60L 50/10* (2019.02); *B60L 50/13* (2019.02); *B60L 50/14* (2019.02); *B60L 50/61* (2019.02); *B60W 10/06* (2013.01); *B60W 10/08* (2013.01); *B60W 20/00* (2013.01); *B60W 20/19* (2016.01); *B60W 20/50* (2013.01); *G07C 5/006* (2013.01); *G07C 5/008* (2013.01); *G07C 5/0825* (2013.01); *H02K 1/27* (2013.01); *H02K 7/006* (2013.01); *H02K 7/1815* (2013.01); *H02K 21/021* (2013.01); *H02K 21/026* (2013.01); *H02K 21/028* (2013.01); *H02K 21/24* (2013.01); *H02M 7/44* (2013.01); *H02P 9/04* (2013.01); *H02P 9/14* (2013.01); *H02P 9/40* (2013.01); *B60K 6/24* (2013.01); *B60K 6/34* (2013.01); *B60K 6/46* (2013.01); *B60K 6/48* (2013.01); *B60K 2001/001* (2013.01); *B60L 2220/14* (2013.01); *B60L 2220/50* (2013.01); *B60L 2240/429* (2013.01); *B60W 2300/365* (2013.01); *B60W 2510/083* (2013.01); *B60W 2520/105* (2013.01); *B60W 2710/0644* (2013.01); *B60W 2710/08* (2013.01); *B60W 2710/083* (2013.01); *B60W 2720/106* (2013.01); *B60Y 2200/92* (2013.01); *H02P 27/06* (2013.01); *H02P 2101/25* (2015.01); *H02P 2101/45* (2015.01); *Y02T 10/6217* (2013.01); *Y02T 10/641* (2013.01); *Y02T 10/642* (2013.01); *Y02T 10/7005* (2013.01); *Y02T 10/7077* (2013.01); *Y10S 903/905* (2013.01); *Y10S 903/906* (2013.01); *Y10S 903/93* (2013.01)

(58) Field of Classification Search
CPC ..... B60W 2510/083; B60W 2300/365; B60W 2520/105; B60W 2720/106; B60K 6/24; B60K 6/26; B60K 6/48; Y10S 903/905; Y10S 903/906; H02K 7/1815
USPC ........................................................ 701/22
See application file for complete search history.

(56) References Cited

U.S. PATENT DOCUMENTS

| 6,057,622 | A | 5/2000 | Hsu | |
|---|---|---|---|---|
| 6,072,258 | A | 6/2000 | Lamb | |
| 6,943,531 | B2 | 9/2005 | Fukaya | |
| 7,064,454 | B2 | 6/2006 | Fukaya et al. | |
| 7,204,011 | B2 | 4/2007 | Maslov | |
| 8,761,981 | B2 | 6/2014 | Hussain et al. | |
| 2002/0170757 | A1 | 11/2002 | Kitada et al. | |
| 2002/0193923 | A1 | 12/2002 | Toyama et al. | |
| 2006/0152104 | A1 | 7/2006 | Hino et al. | |
| 2007/0029887 | A1 | 2/2007 | Murota et al. | |
| 2007/0096581 | A1 | 5/2007 | Zepp et al. | |
| 2007/0227792 | A1 | 10/2007 | Yonemori et al. | |
| 2009/0134723 | A1 | 5/2009 | Takeuchi | |
| 2009/0206602 | A1 | 8/2009 | Nakamura et al. | |
| 2009/0212728 | A1 | 8/2009 | Yagi et al. | |
| 2010/0131139 | A1* | 5/2010 | Sakai | B60K 6/46 701/22 |
| 2011/0121676 | A1 | 5/2011 | Zhu et al. | |
| 2011/0133592 | A1 | 6/2011 | Hino et al. | |
| 2011/0202219 | A1* | 8/2011 | Ishibashi | B60L 53/68 701/22 |
| 2011/0246010 | A1* | 10/2011 | de la Torre Bueno | B60K 6/46 701/22 |
| 2012/0126740 | A1 | 5/2012 | Kauppi | |
| 2012/0197472 | A1* | 8/2012 | He | B60K 6/105 701/22 |
| 2013/0096745 | A1 | 4/2013 | Hussain et al. | |
| 2013/0127244 | A1* | 5/2013 | Handa | B60L 1/00 307/9.1 |

FOREIGN PATENT DOCUMENTS

| CN | 103503277 A | 1/2014 |
|---|---|---|
| EP | 1132251 A1 | 9/2001 |
| EP | 1615319 A1 | 1/2006 |
| EP | 1705784 A2 | 9/2006 |
| EP | 1859985 A2 | 11/2007 |
| EP | 1993187 A1 | 11/2008 |
| JP | 2002-345109 A | 11/2002 |
| JP | 2003-306183 A | 10/2003 |
| JP | 2006-271040 A | 10/2006 |
| JP | 2007-195334 A | 8/2007 |
| JP | 2008-048519 A | 2/2008 |
| JP | 2008-285011 A | 11/2008 |
| JP | 2009-195051 A | 8/2009 |
| JP | 2009-225656 A | 10/2009 |
| JP | 2011-092008 A | 5/2011 |
| JP | 2012-044792 A | 3/2012 |
| JP | 2013-180645 A | 9/2013 |
| JP | 2014-084034 A | 5/2014 |
| JP | 2014-108673 A | 6/2014 |
| TW | M358746 U1 | 6/2009 |
| TW | I345539 B1 | 7/2011 |
| TW | M421259 U1 | 1/2012 |
| TW | M421388 U1 | 1/2012 |
| TW | 2013-015627 A | 4/2013 |
| TW | 201315627 | 4/2013 |
| TW | I401858 B1 | 7/2013 |
| WO | WO 2014-054069 A1 | 4/2014 |

* cited by examiner

VEHICLE AND ENGINE GENERATOR UNIT FOR DRIVING VEHICLE

CROSS-REFERENCE TO RELATED APPLICATIONS

This is a continuation-in-part application of International Application PCT/JP2015/082932, filed on Nov. 24, 2015, which is based on, and claims priority to, Japanese Patent Application No. 2014-237372, filed on Nov. 25, 2014, and Japanese Patent Application Nos. 2015-196667, 2015-196668, 2015-196669 and 2015-196670, all filed on Oct. 2, 2015, the contents of which are incorporated herein by reference.

TECHNICAL FIELD

The present invention relates to a vehicle and an engine generator unit for driving vehicle.

BACKGROUND ART

A vehicle with an engine mounted thereon, which is driven by the engine, is in wide use today. Examples of the vehicle include an automobile and a straddled vehicle. In such a vehicle, generally, a liquid fuel such as gasoline or gas oil is used as an engine fuel.

Refueling the vehicle with a liquid fuel is performed in a gas station, for example. The gas station is widespread in these days. A gas-station network is constructed over a wide range. It is therefore relatively easy for a user to go to a gas station for refueling a vehicle with a liquid fuel in case of deficiency of the liquid fuel. In general, refueling the vehicle with a liquid fuel at a gas station is completed in a few minutes. Thus, the refueling the vehicle with a liquid fuel is easy and convenient for a user. From this point of view, a vehicle (hereinafter also referred to as an engine vehicle) provided with an engine that is operated with a liquid fuel is user-friendly.

As for maintenance of the engine, on the other hand, there are many maintenance items. Performing a maintenance operation on the engine is more complicated than refueling with the liquid fuel. Therefore, the maintenance of the engine takes a relatively long time.

Patent Literature 1 (PTL1) (identified further on) discloses a scooter-type motorcycle. The scooter-type motorcycle of Patent Literature 1 has a plurality of maintenance holes formed in a part of a vehicle body. This configuration of the scooter-type motorcycle of Patent Literature 1 makes it easy to perform maintenance of the engine and therearound.

CITATION LIST

Patent Literature

PTL1: Japanese Patent Application Laid-Open No. 2003-306183

SUMMARY OF THE INVENTION

For a user, it is preferable that a maintenance time required for maintenance of the engine is as short as possible. In this respect, the scooter-type motorcycle of Patent Literature 1 still leaves room for improvement.

An object of the present invention is to provide a vehicle that is as convenient as an engine vehicle from the user's standpoint and able to shorten a maintenance time for maintenance of the engine vehicle from the user's standpoint; and an engine generator unit for driving vehicle, the engine generator unit being mountable to the vehicle.

Embodiments of the present invention can adopt the following configurations.

In a first aspect, embodiments of the invention include a vehicle comprising a vehicle body, an electromotive driving unit mounted on the vehicle body, the electromotive driving unit driven electrically, an engine operable with a liquid fuel, a generator that generates electric power, the generator driven by the engine, and a control device including a power generation control unit and an electric power output unit, the power generation control unit outputting a signal for controlling the engine and the generator, the electric power output unit outputting electric power generated by the generator to the electromotive driving unit. The control device in combination with the engine and the generator constitute a physically integrated unit that is mountable to and dismountable from the vehicle body, the control device configured to output a store visit promotion signal to an informing device while the unit is mounted on the vehicle body, the informing device prompting a visit to a store where the unit is replaceable. The control device directs the electric power output unit to output electric power to the electromotive driving unit without interposition of a battery while the unit is mounted on the vehicle body.

The vehicle travels by electrically driving the electromotive driving unit mounted on the vehicle body. The electric power output unit outputs electric power of the generator, which is driven by the engine, to the electromotive driving unit. The control device outputs electric power to the electromotive driving unit without interposition of a battery. The power generation control unit is, therefore, able to control electric power to be outputted from the electric power output unit, without being influenced by constraints on the battery voltage. The power generation control unit is able to perform the control such that at least any of the engine, the generator, and the electromotive driving unit is allowed to exert high performance.

The engine is operated by being refueled with a liquid fuel, which is easy and convenient for a user. Thus, the vehicle is user-friendly. In the vehicle, the control device, the engine, and the generator constitute a unit. The unit is mountable to and dismountable from the vehicle body. The unit can be replaced so that the vehicle can be continuously used even when the engine or the generator needs maintenance. The unit outputs not rotational power but electric power to the electromotive driving unit of the vehicle body. In this case, mounting and dismounting the unit to and from the vehicle body is easier than, for example, mounting and dismounting the engine alone. Furthermore, the control device outputs the store visit promotion signal to the informing device while the unit is mounted on the vehicle body. An output of the informing device promotes a visit to the store. Since the vehicle comes to the store, it is easy to replace the unit when the engine or the generator needs maintenance.

Accordingly, the vehicle is as convenient as the engine vehicle from the user's standpoint, and able to shorten a maintenance time for maintenance of the vehicle from the user's standpoint.

In a second aspect, in the vehicle of the first aspect, the control device outputs the store visit promotion signal at a timing that is at least within a period during which the engine drives the generator so that the generator generates electric power.

In the configuration of the second aspect, the store visit promotion signal is outputted while the engine is causing the generator to generate electric power. That is, the store visit promotion signal is outputted under a state where the engine does not have such an abnormality that prevents the engine from causing electric power generation of the generator. Therefore, the user's visit to the store is promoted even though the engine does not have such an abnormality that prevents the engine from causing electric power generation of the generator. The frequency of maintenance of the engine or the generator can be increased. This can suppress occurrence or worsening of an abnormality of the engine, the generator, or the like. Accordingly, occurrence of a situation in which an abnormality of the engine, the generator, or the like, obstructs traveling of the vehicle can be suppressed. Once any obstruction to traveling of the vehicle occurs, it would be difficult for the user to drive the vehicle by himself/herself to go to the store. In such a case, the vehicle needs to be transported to the store by any transportation means. This prolongs the maintenance time for maintenance of the engine vehicle from the user's standpoint. The configuration of the second aspect can suppress occurrence of a situation in which traveling of the vehicle is obstructed by an abnormality of the engine or the generator. This shortens the maintenance time for maintenance of the engine vehicle from the user's standpoint. Since occurrence or worsening of an abnormality of the engine or the generator is suppressed because of the increased frequency of maintenance, the lifetime of the engine or the generator can be extended.

In a third aspect, in the vehicle of the first or second aspects, the control device includes a detection unit that detects a functional abnormality of a component of the engine, and the control device outputs the store visit promotion signal based on detection of the abnormality by the detection unit.

In the configuration of the third aspect, the store visit promotion signal is outputted based on detection of a functional abnormality of a component of the engine. Therefore, a visit to the store is promoted by the output of the informing device when a functional abnormality is occurring in the component of the engine. Accordingly, the configuration of the third aspect is able to prompt replacement of the unit in the store before the abnormality worsens. This can suppress occurrence of a situation in which an abnormality of the engine worsens to a level that obstructs traveling of the vehicle. As a result, the maintenance time for maintenance of the vehicle is shortened from the user's standpoint.

In a fourth aspect, in the vehicle of any one of the first to third aspects, the unit is provided with a fuel tank that supplies a liquid fuel to the engine, and the control device outputs the store visit promotion signal based on the amount of liquid fuel in the fuel tank.

In the configuration of the fourth aspect, the store visit promotion signal is outputted based on the amount of liquid fuel in the fuel tank. Thus, a visit to the store is promoted even though no abnormality is detected in the engine or in components. This can increase the probability that any abnormality is recognized in the store's check and the unit can be replaced in the store. Accordingly, the maintenance time for maintenance of the vehicle is shortened from the user's standpoint.

In a fifth aspect, in the vehicle of any one of the first to fourth aspects, the control device outputs the store visit promotion signal based on history information of the unit. The history information includes at least one of total history information and section history information, the total history information being an accumulation from start of use of the unit itself, the section history information being an accumulation from when the unit is mounted on the vehicle body to when the unit is dismounted from the vehicle body. The history information relates to at least one of the values of cumulative elapsed time during which the unit has been mounted on the vehicle body; cumulative operating time of the engine; the cumulative number of rotations of the engine; cumulative power generation of the generator; and the cumulative travel distance of the vehicle including the vehicle body with the unit mounted thereon.

In the configuration of the fifth aspect, the store visit promotion signal is outputted based on the history information of the unit. Thus, a visit to the store is promoted even though no abnormality is detected in the engine or in components. This can increase the probability that any abnormality is recognized in the store's check and the unit can be replaced in the store. Accordingly, the maintenance time for maintenance of the vehicle is shortened from the user's standpoint.

In a sixth aspect, embodiments of the invention include an engine generator unit for driving a vehicle, mountable to the vehicle of any one of the first to fifth aspects, wherein the engine generator unit for driving the vehicle includes the engine, the generator, and the control device. The engine, the generator, and the control device are configured to be mountable to and dismountable from the vehicle body in a physically integrated manner. The control device includes a power generation control unit that outputs a signal for controlling the engine and the generator, a store visit promotion signal output unit that outputs the store visit promotion signal to the informing device while the unit is mounted on the vehicle body, the informing device prompting a visit to a store where the unit is replaceable, and the electric power output unit that outputs electric power to the electromotive driving unit without interposition of a battery while the unit is mounted on the vehicle body.

The engine generator unit of the sixth aspect is user-friendly. The engine generator unit is mountable to and dismountable from the vehicle body. The unit can be replaced so that the vehicle can be continuously used even when the engine or the generator needs maintenance. The control device outputs the store visit promotion signal to the informing device while the unit is mounted on the vehicle body. An output of the informing device promotes a visit to the store. Since the vehicle comes to the store, it is easy to replace the engine generator unit when the engine or the generator needs maintenance.

Accordingly, the engine generator unit of the sixth aspect is as convenient as the engine, and able to shorten the maintenance time for maintenance of the vehicle from the user's standpoint.

Advantageous Effects of the Invention

The present invention can provide the same level of convenience as that of an engine vehicle from the user's standpoint, and can shorten a maintenance time for maintenance of the engine vehicle from the user's standpoint.

DETAILED DESCRIPTION

Figure 1:
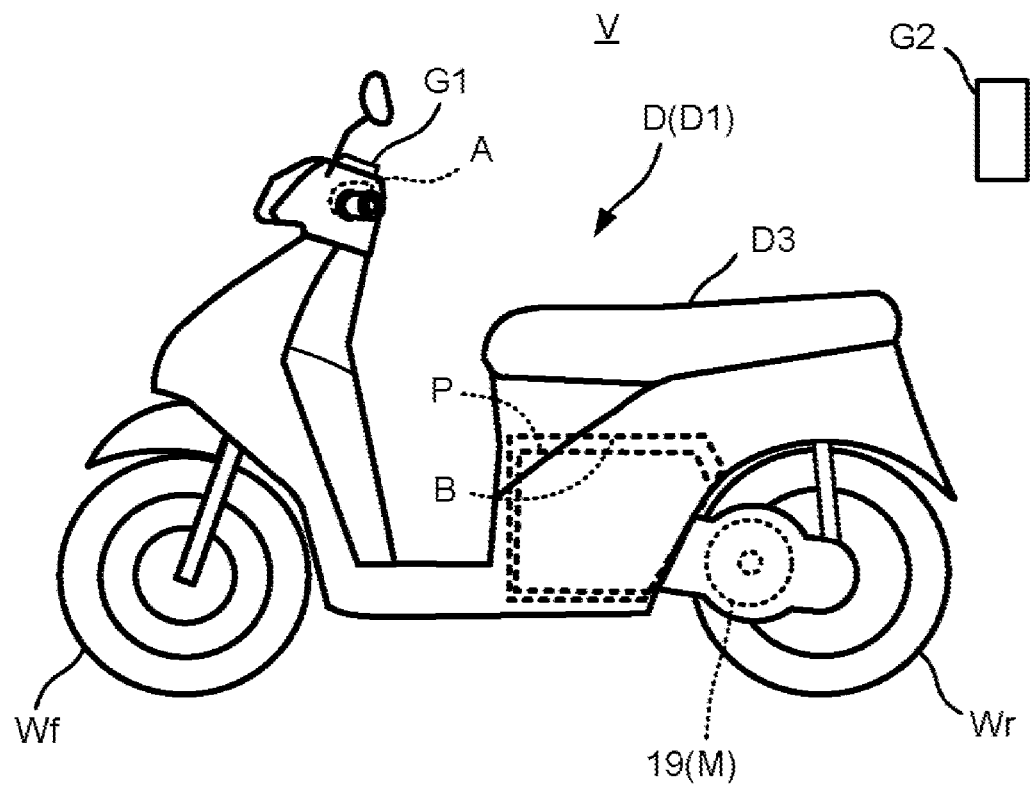
FIG. 1 is a diagram showing an external appearance of a vehicle according to a first embodiment of the present invention.

To solve the problems described above, the present inventor conducted the following analyses and studies.

For maintenance of an engine mounted on a vehicle, a user normally drives the vehicle to go to a store where the maintenance is to be performed. The engine, therefore, has a high temperature when the vehicle arrives at the store. Some maintenance of the engine needs to be performed after the engine is cooled to ambient temperature. The maintenance of the engine is not performed until the engine is cooled. The user has to wait a relatively long time until the maintenance of the engine is completed. In such a case, the store may sometimes prepare a so-called loaner vehicle for the user. The user can use the loaner vehicle until the maintenance of the engine is completed. The user has to return the loaner vehicle after the maintenance of the engine is completed. While the user is using the loaner vehicle, the user's activity and activity range are constrained by the use of the loaner vehicle. The user, therefore, may feel discomfort or troublesomeness in maintenance of the engine.

As is obvious from the circumstances described above, a maintenance time for the user is different from a maintenance time for an engineer or a mechanic of the store. The maintenance time for the engineer or the mechanic of the store means a time period from when the engineer or the mechanic himself/herself starts a maintenance operation to when he/she completes the maintenance operation. This time required for the maintenance does not include, for example, a time taken for the engine to be cooled to ambient temperature. On the other hand, the maintenance time for the user is not simply a time period during which the maintenance is actually performed. The maintenance time for the user includes, for example, the time taken for the engine to be cooled. The maintenance time for the user further includes a time period in which the user's activity and activity range are constrained by the use of the loaner vehicle. When the maintenance time for the user is long, the user is likely to feel discomfort or troublesomeness in maintenance of the engine.

Shortening the maintenance time for the user is important in terms of improving the convenience of an engine vehicle. As mentioned above, the engine vehicle already possesses sufficient convenience in terms of refueling. In addition, the engine vehicle already possesses excellent power performance. If the already possessed convenience is impaired by an attempt to shorten the maintenance time, improvement of convenience of the engine vehicle could be hardly achieved.

A problem is, therefore, how to achieve the same level of convenience as that of the engine vehicle from the user's standpoint while shortening the maintenance time required for maintenance of the engine vehicle from the user's standpoint.

The present inventor made studies on this problem, to reach an idea of unifying an engine, a generator, and a control device into an engine generator unit for driving a vehicle, which is mounted to the vehicle, allowing the engine generator unit to be dismountable, and configuring the unit so as to output a store visit promotion signal to an informing device.

With this configuration, when a user drives the vehicle to go to a store where maintenance is to be performed, the store can dismount the engine generator unit for driving the vehicle from the vehicle and mount another engine generator unit for driving the vehicle, on which maintenance has been done in advance, to the vehicle. In this case, the maintenance time for maintenance of the engine from the user's standpoint is substantially equal to a time required for replacement of the engine generator unit for driving the vehicle. Therefore, the maintenance time for maintenance of the engine from the user's standpoint is shortened. The discomfort or troublesomeness involved in the maintenance for the user can be reduced.

The configuration described above, in which the store visit promotion signal is outputted to the informing device, is able to prompt the user to visit a store where the engine generator unit for driving the vehicle is replaceable.

This can increase the frequency of the user's visiting the store. Since the discomfort or troublesomeness involved in the maintenance for the user is reduced as a result of the unification described above, it is likely that the frequency of the user's visiting the store increases.

The increased frequency of the user's visiting the store enables the store to early find a cause of a functional abnormality of the engine. In addition, replacement of the unit and maintenance of the engine can be performed before the abnormality worsens or its influence on other parts increases.

In the following, the present invention is described based on preferred embodiments and with reference to the drawings.

First Embodiment

FIG. 1 is a diagram showing an external appearance of a vehicle V according to a first embodiment of the present invention.

The vehicle V shown in FIG. 1 is a motorcycle.

The vehicle V shown in FIG. 1 includes a vehicle body D, an electromotive driving unit 19, and an engine generator unit P (hereinafter referred to as a unit P).

The vehicle body D includes a vehicle main body D1 and two wheels Wf, Wr. The wheels Wf, Wr are rotatably supported on the vehicle main body D1.

The vehicle main body D1 includes a frame (not shown), a request indication unit A, and a seat D3.

A user is seated on the seat D3. The request indication unit A outputs a torque request. The request indication unit A has an accelerator operator. More specifically, the request indication unit A is operated by a driver of the vehicle V. The request indication unit A outputs a request for acceleration of the vehicle V based on an operation and the status of traveling of the vehicle V. The request for acceleration of the vehicle V corresponds to a torque for driving the drive wheels Wc, Wd. The request for acceleration of the vehicle V corresponds to a request for a torque outputted. The output of the vehicle V corresponds to an output of a motor 18. The request for acceleration of the vehicle V corresponds to a request for an output torque of the motor 18. The output torque of the motor 18 corresponds to a current supplied to the motor 18. Therefore, the output torque of the motor 18 corresponds to a current outputted from a generator 10. The request indication unit A outputs, as an acceleration request, a torque request requesting a torque outputted from the motor. The torque request requesting a torque corresponds to a current request requesting a current supplied from the generator 10 to the motor 18.

The vehicle body D also includes an informing device G1. The informing device G1 performs an informing operation for providing information to the user. FIG. 1 also shows an informing device G2 that operates in association with the vehicle V. The informing device G2 is a device separate from the vehicle V. Details of the informing devices G1, G2 is described later.

The electromotive driving unit 19 is mounted on the vehicle body D. The electromotive driving unit 19 is electrically driven. The electromotive driving unit 19 includes the motor 18 (see FIG. 2). The motor 18 is connected to the drive wheel Wr serving as a drive mechanism, so as to transmit rotational power thereto. The motor 18 of the electromotive driving unit 19 drives the drive wheel Wr, thus driving the vehicle V.

The unit P is a drive source of the vehicle V. The unit P is mountable to the vehicle V. The vehicle body D of the vehicle V is provided with a storage part B. The unit P is stored in the storage part B. The unit P is mounted to the vehicle body D, allowing the unit P to be dismountable. The unit P is mounted to the vehicle body D independently of the electromotive driving unit 19.

Figure 2:
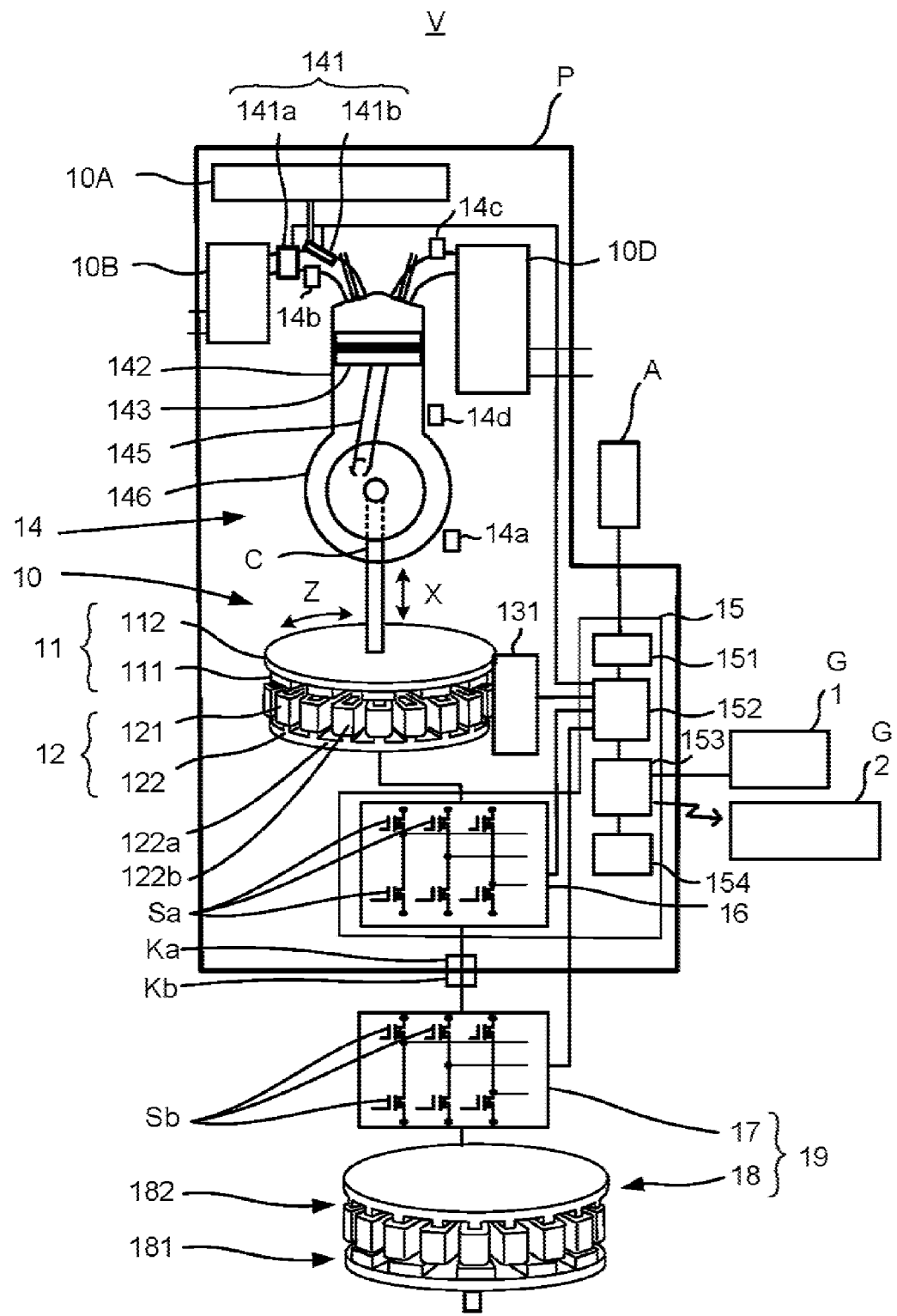
FIG. 2 is a block diagram showing an outline configuration of the vehicle shown in FIG. 1.

FIG. 2 is a block diagram showing an outline configuration of the vehicle V shown in FIG. 1.

The vehicle V includes the generator 10, an engine 14, a control device 15, and the electromotive driving unit 19.

The control device 15 as well as the engine 14 and the generator 10 is included in the unit P. In other words, the unit P includes the control device 15, the engine 14, and the generator 10.

The unit P does not output mechanical power to the outside of the unit P. The unit P outputs electric power to the outside of the unit P. The unit P supplies electric power to the electromotive driving unit 19.

The unit P includes a connector Ka. The unit P includes a fuel tank 10A, an air cleaner 10B, a muffler 10D, and an electric power output unit 16. The fuel tank 10A is provided with a fuel sensor (not shown) that detects the amount of fuel.

The generator 10, the engine 14, the control device 15, the connector Ka, the fuel tank 10A, the air cleaner 10B, the muffler 10D, and the electric power output unit 16 are integrally assembled. Accordingly, the engine 14, the control device 15, the connector Ka, the fuel tank 10A, the air cleaner 10B, the muffler 10D, and the electric power output unit 16, which form the unit P, are integrally mounted to and dismounted from the vehicle body D (see FIG. 1) of the vehicle V.

The unit P is an apparatus that is, as a physically single body, mounted to and dismounted from the vehicle body D. The unit P is configured such that all parts included in the unit P form a single body that is mountable to and dismountable from the vehicle body D. All parts included in the unit P are, for example, the generator 10, the engine 14, the control device 15, and the like. That is, the generator 10, the engine 14, and the control device 15 are configured as a physically single body that constitutes the unit P. The generator 10, the engine 14, and the control device 15 are, as a physically single body, mountable to and dismountable from the vehicle body D.

The unit P may be configured to be mounted to and dismounted from the vehicle body D without using a fixture member (e.g., a screw) that is attachable to and detachable from the vehicle body D and the unit P. For example, the unit P may be configured to be mounted to and dismounted from the vehicle body D by a mounting mechanism provided in the vehicle body D and/or the unit P. The unit P may be configured to be mounted to and dismounted from the vehicle body D with a fixture member that is attachable to and detachable from the vehicle body D and the unit P. The unit P may be configured such that a worker can perform an operation for mounting or dismounting the unit P by physically and directly operating the unit P with or without use of a tool. The unit P may be configured such that the operation for mounting or dismounting the unit P can be performed by machine equipment without a worker performing a direct and physical operation on the unit P. The unit P may be configured as a physically single body that is mountable to and dismountable from the vehicle body D and that has at least one component thereof individually mountable to and dismountable from the vehicle body D. The unit P may be configured such that it can be refueled while being mounted on the vehicle body D of the vehicle V. The unit P may be configured such that it can be refueled with an engine oil while being mounted on the vehicle body D of the vehicle V.

In a case of a malfunction of any component of the unit P, the unit P can be dismounted from the vehicle V, for repair.

Figure 3:
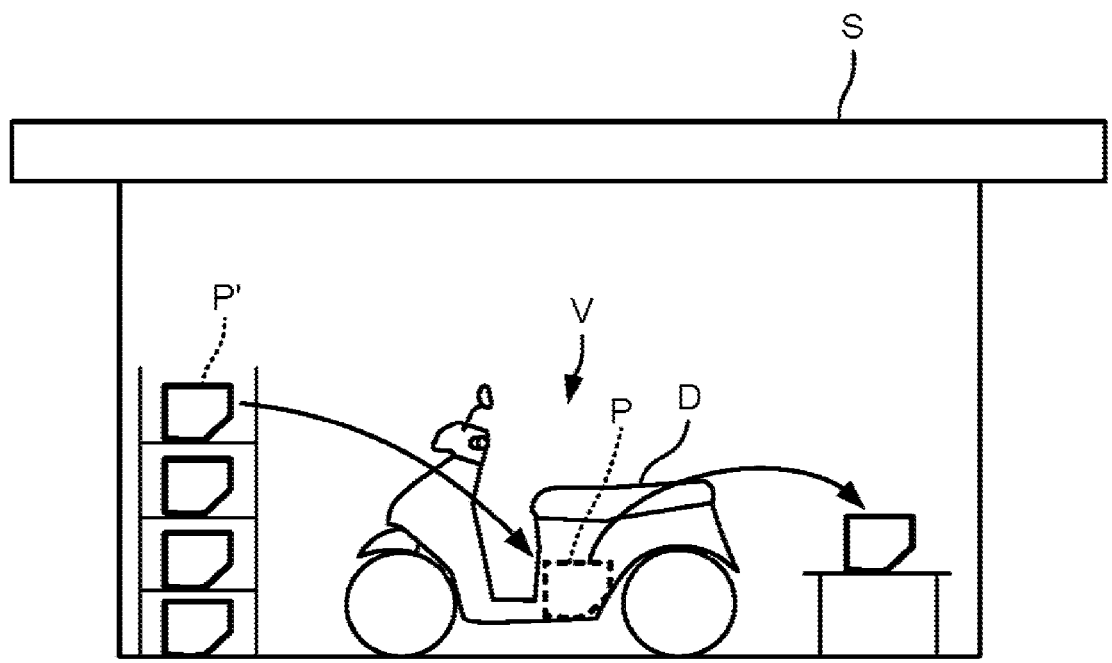
FIG. 3 is a diagram schematically showing a situation in which a unit is replaced.

FIG. 3 is a diagram schematically showing a situation in which the unit P is replaced.

The unit P of the vehicle V is replaced in a store S, for example. The store S stocks replaceable units P'. The unit P of the vehicle V can be replaced with the unit P' prepared in the store S.

Examples of the store S that can replace the unit P include a gas station, a vehicle dealer, and a vehicle component dealer. The store S is not limited to these examples. These stores are widespread. In particular, a gas-station network is constructed over a wide range.

When maintenance of the engine 14 or the generator 10 of the vehicle V is required, the unit P of the vehicle V is replaced with another unit P' in the store S. The unit P can be replaced so that the vehicle V can be continuously used even when the engine 14 or the generator 10 needs maintenance.

In the replacement of the unit P, mechanism parts included in the unit P are collectively replaced. The unit P outputs not rotational power but electric power to the electromotive driving unit 19 (see FIG. 2) of the vehicle body D. In general, a mechanical connection and adjustment operation required when mounting an electric power supply mechanism to a vehicle body is simpler than a mechanical connection and adjustment operation required when mounting a rotational power transmission mechanism to a vehicle body. Thus, mounting and dismounting of the unit P to and from the vehicle body D is easy. For example, in a case of replacing only the engine 14 of the vehicle V, an operation for mechanically connecting the engine 14 to portions other than the engine and adjusting them is required. In this respect, for example, in a case of replacing the unit P, an operation for connecting one portion of the mechanism parts to portions other than the one portion and adjusting them is reduced, which operation would be required when the one portion is replaced.

When the engine 14 needs close inspection or repair, much time can be spent for the inspection or repair after the unit P is dismounted from the vehicle V in the replacement. The vehicle V is usable after the replacement of the unit P is completed. Thus, the maintenance time for maintenance of the engine from the user's standpoint is shortened.

The unit P having been inspected or repaired is used for next replacement of a unit P in the store S. That is, the unit P is reused (recycled). The unit P is mounted to, for example, a vehicle other than the vehicle V from which the unit P was dismounted.

Preferably, the store S stocks a unit P' that has been refueled with a liquid fuel. In such a case, replacement of the unit P in the store S involves completion of refueling. The replacement of the unit P may be performed for the purpose of refueling. Refueling with a liquid fuel is completed in a shorter time than, for example, charging a battery. The unit P dismounted for replacement, after refueled in a short time, recovers a mountable state for replacement. Accordingly, a less number of units P' need be stocked for replacement in the store S.

The unit P can be easily transferred to a vehicle of a different type than the vehicle V. Here, the vehicle of the different type has a structure capable of storing the unit P and includes a mating connector connectable with the connector Ka (see FIG. 2). For example, one engine generator unit P is shared among a plurality of types of vehicles.

In general, the lifetime of the engine 14 is longer than the lifetime of a rechargeable battery. The lifetime of the engine 14 can be further extended by the maintenance of the engine 14. In some case, the lifetime of the engine 14 is longer than the lifetime of the vehicle body D. The engine 14 is, in the unit P, easily replaceable. It is therefore easy that the engine 14 is reused instead of being disposed of while only the vehicle body D is changed to another type one.

In addition, the vehicle body D not including the unit P can be made commercially available. Since the vehicle body D does not include the unit P, the need for testing of the engine, and the like, can be eliminated.

As the unit P, for example, a plurality of types of units P having different volumes of engine exhaust can be provided. It is also easy to change the specification of the unit P to another specification in accordance with the user's demand. A vehicle V whose characteristics comply with the user's demands can be easily configured by a combination of the unit P and the vehicle body D.

It is preferable that vehicle bodies are available for purchase or rental in the store S. It is also preferable that vehicle accessories are available for purchase in the store S.

Referring to FIG. 2 again, the vehicle V and the unit P is described.

For mounting the unit P to the vehicle body D of the vehicle V, the connector Ka is connected to a vehicle connector Kb provided in the vehicle body D of the vehicle V. The connector Ka and the vehicle connector Kb relay a current that is supplied from the generator 10 of the unit P to the motor 18.

A control signal connector (not shown) is provided between the control device 15 and the request indication unit A and between the control device 15 and the informing device G1. The connector Ka and the vehicle connector Kb may double as the control signal connector.

The engine 14 is an internal combustion engine. The engine 14 is operated with a liquid fuel. The engine 14 causes a fuel to combust. Thus, the engine 14 outputs mechanical power. The engine 14 includes an output shaft C. The output shaft C is, for example, a crankshaft. FIG. 2 schematically shows the connection relationship between the engine 14 and the output shaft C. The engine 14 includes a cylinder 142, a piston 143, a connecting rod 145, and a crank case 146. The cylinder 142 and the piston 143 define a combustion chamber. The piston 143 and the crankshaft serving as the output shaft C are connected via the connecting rod 145.

The engine 14 is supplied with air via the air cleaner 10B. The engine 14 is supplied with a fuel from the fuel tank 10A. The engine 14 causes the fuel supplied from the fuel tank 10A to combust in the combustion chamber. This makes the piston 143 move to-and-fro. The crankshaft serving as the output shaft C converts the to-and-fro movement into rotational power. The engine 14 outputs mechanical power through the output shaft C. An exhaust gas generated by the combustion in the engine 14 is discharged via the muffler 10D.

As for power transmission from the engine 14 to the drive wheel Wr (see FIG. 1), the engine 14 is not connected to the drive wheel Wr by any mechanical component. A mechanical system of the unit P is closed in the unit P. That is, all of the rotational power outputted from the engine 14 is converted into power other than mechanical power in the unit P. The rotational power generated by the engine 14 is converted exclusively into electric power. More specifically, all of the mechanical power generated by the engine 14 except a loss is converted into electric power by the generator 10. The electric power resulting from the conversion in the generator 10 is converted into mechanical power by the motor 18 outside the unit P.

The unit P does not directly drive an external mechanism arranged outside the unit P by using the rotational power of the engine 14. Therefore, the control of the rotational power of the engine 14 is less influenced by constraints inherent in operation characteristics of the external mechanism. This provides a high degree of freedom in terms of controlling the rotational power of the engine 14.

The engine 14 includes an engine output adjustment unit 141. The engine output adjustment unit 141 adjusts the rotational power of the engine 14. The engine output adjustment unit 141 includes a throttle valve adjustment mechanism 141a and a fuel injection device 141b. The throttle valve adjustment mechanism 141a adjusts the amount of air taken in by the engine 14. The fuel injection device 141b supplies the fuel to the engine 14. The engine output adjustment unit 141 controls the amount of air taken in and the amount of fuel injected by the engine 14. In this manner, the engine output adjustment unit 141 adjusts the rotational power outputted from the engine 14. For example, the engine output adjustment unit 141 increases the amount of air taken in and the amount of fuel injected by the engine 14. This causes an increase of the rotational power of the engine 14. As the rotational power of the engine 14 increases, the rotation speed of the engine 14 which means the rotation speed of the output shaft C increases.

The engine output adjustment unit 141 changes the rotational power of the engine 14, thus adjusting the voltage and current generated by the generator 10.

The engine 14 includes a crank angle sensor 14a, an intake pressure sensor 14b, an oxygen concentration sensor 14c, and an engine temperature sensor 14d. The crank angle sensor 14a detects the rotation position of the crankshaft. The crank angle sensor 14a detects the rotation speed of the engine 14. The intake pressure sensor 14b detects the intake pressure of the engine 14. The oxygen concentration sensor 14c detects the amount of oxygen in the exhaust of the engine 14. The engine temperature sensor 14d detects the temperature of the engine 14.

The engine 14 also includes a fuel sensor, an oil sensor, a cam angle sensor, an exhaust device, an air temperature sensor, a decompression solenoid, an ignition coil, and a cooling fan (not shown).

As for power transmission from the engine 14 to the generator 10, the generator 10 is mechanically connected to the engine 14. The generator 10 is connected to the output shaft C of the engine 14. In this embodiment, the generator 10 is directly connected to the output shaft C. The generator 10 receives rotational power from the engine 14, and supplies a current to the motor 18. The generator 10 is, for example, attached to the crank case 146 of the engine 14. Alternatively, for example, the generator 10 may be arranged in a position distant from the crank case 146.

The generator 10 includes a rotor 11, a stator 12, and a supply current adjustment unit 131.

The generator 10 is a three-phase brushless generator. The rotor 11 and the stator 12 constitute a three-phase brushless generator.

The rotor 11 includes permanent magnets. To be more specific, the rotor 11 includes a plurality of magnetic pole parts 111 and a back yoke part 112. The magnetic pole part 111 is made of a permanent magnet. The back yoke part 112 is made of, for example, a ferromagnetic material. The magnetic pole parts 111 are arranged between the back yoke part 112 and the stator 12. The magnetic pole parts 111 are attached to the back yoke part 112. The plurality of magnetic pole parts 111 are arranged so as to align in a circumferential direction Z about the rotation axis of the rotor 11, that is, so as to align in the direction of rotation of the rotor 11. The plurality of magnetic pole parts 111 are arranged such that N-poles and S-poles alternate with respect to the circumferential direction Z. The generator 10 is a three-phase brushless generator of permanent magnet type. A winding for supplying a current is not provided on the rotor 11.

The stator 12 is arranged opposite to the rotor 11. The stator 12 includes a plurality of windings 121 and a stator core 122. The stator core 122 is made of, for example, a ferromagnetic material. The stator core 122 forms a magnetic circuit of the stator 12. The plurality of windings 121 are wound on the stator core 122. The stator core 122 includes a core main body 122a (see FIG. 7) and a plurality of teeth 122b. The core main body 122a functions as a yoke.

The plurality of teeth 122b extend from the core main body 122a toward the rotor 11. The teeth 122b extending toward the rotor 11 have their distal end surfaces opposite to the magnetic pole parts 111 of the rotor 11 with an air gap therebetween. The teeth 122b of the stator core 122 and the magnetic pole parts 111 of the rotor 11 directly face each other. The plurality of teeth 122b, which are arranged at intervals with respect to the circumferential direction Z, align in the circumferential direction Z. Each of the plurality of windings 121 is wound on each of the plurality of teeth 122b. Each winding 121 is wound so as to pass through a slot between the plurality of teeth 122b. Each winding 121 corresponds to any of the three phases, namely, U-phase, V-phase, and W-phase. The windings 121 corresponding to U-phase, V-phase, and W-phase are arrange in order in the circumferential direction Z.

The rotor 11 is connected to the output shaft C of the engine 14. The rotor 11 is rotated along with rotation of the output shaft C. The rotor 11 has the magnetic pole parts 111 rotating in a state where the magnetic pole parts 111 are opposite to the teeth 122b of the stator core 122. As the rotor 11 rotates, magnetic fluxes linked with the windings 121 change. As a result, an induced voltage is generated in the windings 121. This is how the generator 10 performs power generation. The generator 10 supplies a generated current to the motor 18. The current outputted from the generator 10 is supplied to the motor 18. To be specific, the current outputted from the generator 10 is supplied to the motor 18 via the electric power output unit 16, which serves as a converter, and the inverter 17. As the current outputted from the generator 10 increases, a current supplied from the electric power output unit 16 to the inverter 17 increases, so that a current supplied to the motor 18 increases. A voltage outputted from the generator 10 is supplied to the motor 18 via the electric power output unit 16 and the inverter 17.

In this embodiment, the rotor 11 and the stator 12 have an axial gap structure. The rotor 11 and the stator 12 are opposite to each other with respect to the direction (axial direction) X of the rotation axis of the rotor 11. The plurality of teeth 122b included in the stator 12 protrude in the axial direction X from the core main body 122a. In this embodiment, the axial direction X is a direction in which the rotor 11 and the stator 12 are opposite to each other.

The supply current adjustment unit 131 adjusts the current to be supplied from the generator 10 to the motor 18. For adjusting the current to be supplied to the motor 18, the supply current adjustment unit 131 changes the inductance of the winding 121. The supply current adjustment unit 131 changes the magnetic resistance of a magnetic circuit for the winding 121, which passes through the stator core 122. Thus, the supply current adjustment unit 131 changes the inductance of the winding 121. The supply current adjustment unit 131 is a current adjustment mechanism. The adjustment of the current made by the supply current adjustment unit 131 is described later.

The control device 15 controls electric power to be supplied to the electromotive driving unit 19. Thus, the control device 15 controls rotational power to be outputted from the motor 18.

The control device 15 includes a torque request receiving unit 151, a power generation control unit 152, and the electric power output unit 16. The control device 15 also includes a store visit promotion signal output unit 153 and a detection unit 154.

The torque request receiving unit 151, the power generation control unit 152, the store visit promotion signal output unit 153, and the detection unit 154 are constituted of a microcontroller (not shown), for example. The microcontroller includes a central processing unit (not shown) and a storage device (not shown). The central processing unit performs computational processing based on a control program. The storage device stores data concerning programs and computation. The torque request receiving unit 151, the power generation control unit 152, the store visit promotion signal output unit 153, and the detection unit 154 are implemented by the central processing unit executing programs.

The torque request receiving unit 151 receives a torque request. The torque request represents a request for a torque to be outputted from the motor 18. The torque request receiving unit 151 receives a torque request that is outputted in accordance with the amount of operation of the request indication unit A.

The power generation control unit 152 outputs a signal for controlling the engine 14 and the generator 10. The power generation control unit 152 is connected to the engine output adjustment unit 141 and the supply current adjustment unit 131. The control device 15 controls the engine output adjustment unit 141 and the supply current adjustment unit 131 in accordance with the torque request outputted from the request indication unit A.

The detection unit 154 detects a functional abnormality of a component included in the engine 14. The detection unit 154 detects the abnormality based on results of detection made by the crank angle sensor 14a, the intake pressure sensor 14b, the oxygen concentration sensor 14c, and the engine temperature sensor 14d. The detection unit 154 also detects an abnormality based on results of detection made by the fuel sensor, the oil sensor, the cam angle sensor, the exhaust device, the air temperature sensor, the decompression solenoid, the ignition coil, and the cooling fan (not shown).

The electric power output unit 16 outputs electric power generated by the generator 10 to the electromotive driving unit 19. The electric power output unit 16 includes a converter. The electric power output unit 16 performs rectification. The electric power output unit 16 converts a three-phase AC outputted from the generator 10 into a DC. The electric power output unit 16 has an inverter circuit, for example. The electric power output unit 16 has, for example, a three-phase bridge inverter circuit including switching elements each corresponding to each of the three phases. It is also possible that the electromotive driving unit 19 has a bridge circuit including diodes.

An operation of the converter included in the electric power output unit 16 is controlled by the power generation control unit 152. The electric power output unit 16 is able to adjust the current to be supplied to the motor 18 by, for example, changing the timing for turning on/off the switching elements relative to a predetermined phase angle in the three-phase AC. Even while the engine 14 and the generator 10 are operating, the electric power output unit 16 is able to stop the rotation of the motor 18 by, for example, blocking flow of the current generated by the generator 10. A stopped state of the vehicle V is maintained in this manner.

The adjustment made by the electric power output unit 16 is mainly for limiting the current generated by the generator 10. The adjustment made by the electric power output unit 16 is different from controlling the current by changing the inductance of the generator 10. The following description is given under the assumption that the limiting of the current made by the electric power output unit 16 is minimum.

It is also possible that the electric power output unit 16 has a bridge circuit including diodes. That is, the electric power output unit 16 may be configured as a rectifier. In such a case, the controlling of the current by the control device 15 is not performed.

While the unit P is mounted on the vehicle body D (see FIG. 1), the control device 15 causes electric power to be outputted from the electric power output unit 16 to the electromotive driving unit 19 without interposition of a battery. The power generation control unit 152 is, therefore, able to control electric power to be outputted from the electric power output unit 16, without being influenced by constraints on the battery voltage. For example, the power generation control unit 152 is able to control the engine 14 and the generator 10 so as to make the electric power output unit 16 output a voltage higher than the allowable voltage of an ordinary battery. The power generation control unit 152 is able to supply large electric power to the electromotive driving unit 19, without being influenced by constraints on the battery voltage. The engine 14, the generator 10, and the electromotive driving unit 19 are allowed to exert high performance. In this manner, the range of the operation condition of the engine 14 and the generator 10 is expanded. The power generation control unit 152 is also able to control the engine 14 and the generator 10 so as to make the electric power output unit 16 output a voltage lower than the voltage capable of charging an ordinary battery. The fuel efficiency of the engine 14 is improved. In this manner, the power generation control unit 152 is able to perform the control such that at least any of the engine 14, the generator 10, and the electromotive driving unit 19 is allowed to exert high performance.

The inverter 17 supplies the current for driving the motor 18 to the motor 18. The inverter 17 is supplied with a DC from the electric power output unit 16. The inverter 17 converts the DC outputted from the electric power output unit 16 into a three-phase current with phases shifted by 120 degrees. The phases of the three-phase current correspond to the three phases of the three-phase brushless motor, respectively. The inverter 17 has a three-phase bridge inverter circuit, for example. The three-phase bridge inverter circuit includes switching elements Sb each corresponding to each of the three phases. The switching elements Sb are controlled based on a signal supplied from a position sensor (not shown) that detects the rotation position of the rotor 181.

The inverter 17 adjusts on/off operations of the switching elements Sb, to control the voltage to be supplied to the motor 18. For example, the inverter 17 turns on the switching elements Sb based on a pulse-width-modulated signal. The control device 15 adjusts the duty cycle of ON/OFF. Thus, the voltage to be supplied to the motor 18 is controlled to an arbitrary value by the control device 15. This is how the inverter 17 adjusts the electric power to be supplied to the motor 18.

The motor 18 is operated by electric power that is supplied from the generator 10. The motor 18 drives the drive wheel Wr in rotation. Thus, the motor 18 makes the vehicle V travel. As for power transmission, the motor 18 is not mechanically connected to the generator 10.

The motor 18 is, for example, a three-phase brushless motor. The motor 18 includes a rotor 181 and a stator 182. The rotor 181 and the stator 182 of the motor 18 of this embodiment have the same structure as that of the rotor 11 and the stator 12 of the generator 10.

The unit P is electrically connected to the motor 18. It is therefore not necessary to arrange a mechanical power transmission between the unit P and the motor 18. This provides a high degree of freedom in terms of arrangement of the motor 18.

The rotor and the stator of the motor 18 may be configured differently from those of the generator 10. For example, the number of magnetic poles or the number of teeth of the motor 18 may be different from those of the generator 10. For example, an induction motor or a stepper motor may be adopted as the motor 18. For example, a DC motor with brushes may be adopted as the motor 18. The motor 18 is mechanically connected to the drive wheel Wr.

The control device 15 controls the inverter 17. Thus, the control device 15 is able to control the voltage to be supplied to the motor 18 independently of controlling the outputs of the engine 14 and the generator 10. Here, it may be acceptable that the inverter 17 is controlled by control means other than the control device 15.

[Store Visit Promotion Signal]

The store visit promotion signal output unit 153 of the control device 15 outputs a store visit promotion signal to the informing devices G1, G2. The informing devices G1, G2 are operated accordingly.

Figure 4:
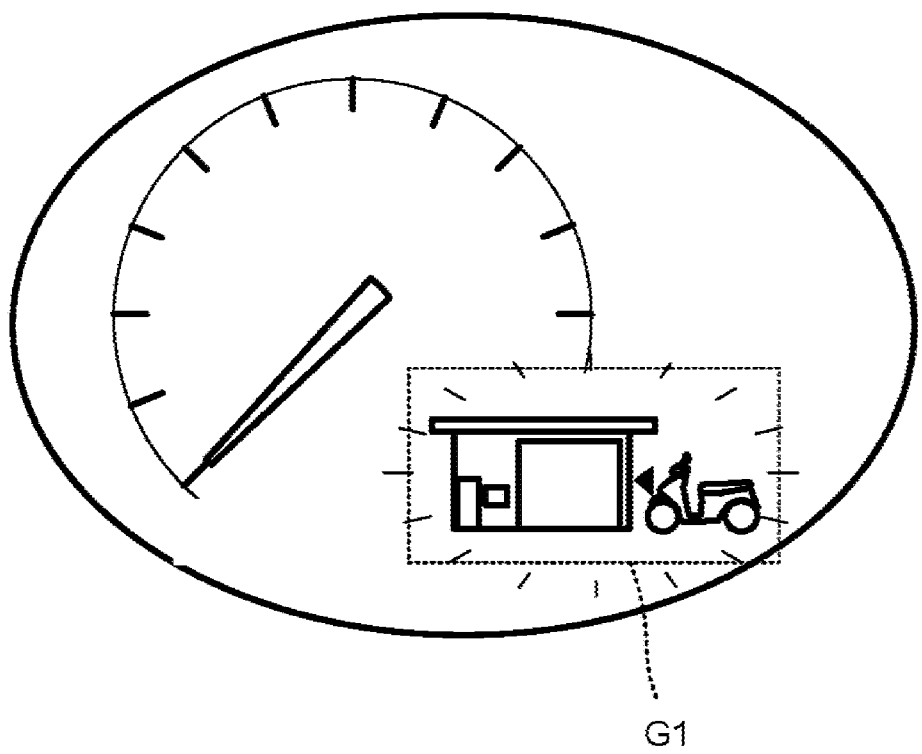
FIG. 4 is a diagram showing an example of information provided by an informing device.
Figure 5:
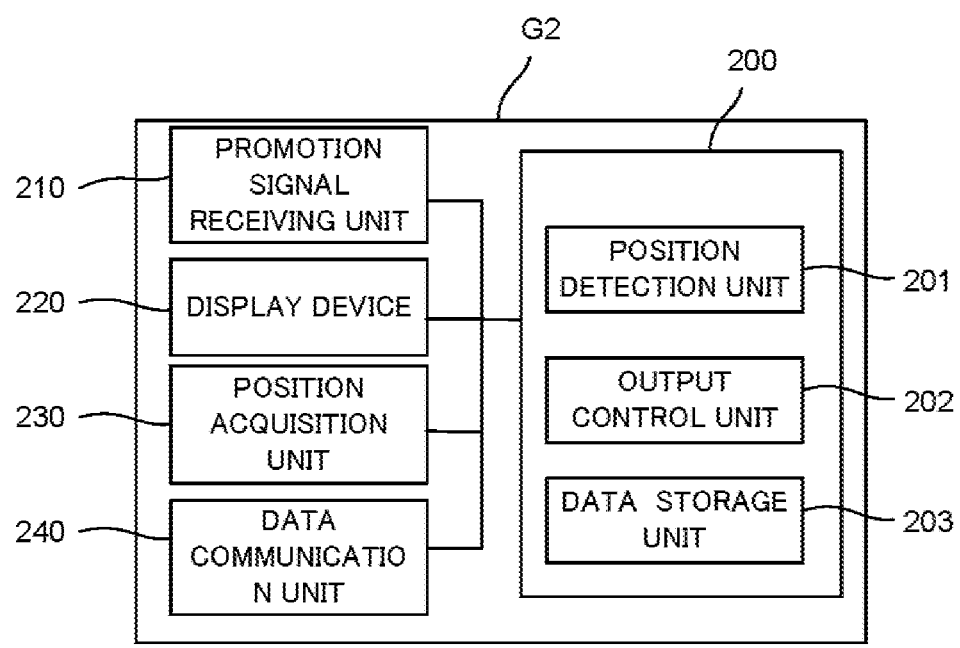
FIG. 5 is a block diagram showing a configuration of an informing device that is provided separately from the vehicle.

The vehicle V includes the informing device G1. One example of the informing device G1 is illustrated in FIG. 4. The informing device G2 is provided physically separate from the vehicle V. One example of the informing device G2 is illustrated in FIG. 5. The informing devices G1, G2 are configured to perform an operation for prompting a visit to a store where the unit is replaceable based on the store visit promotion signal. Hereinafter, the operation for prompting a visit to a store where the unit is replaceable is also referred to as a store visit promotion operation.

The store visit promotion signal is a signal that causes the informing devices G1, G2 to perform the operation for prompting a visit to a store where the unit is replaceable. Upon receiving the store visit promotion signal from the store visit promotion signal output unit 153, the informing devices G1, G2 output information for prompting a visit to the store. As a result, the information is provided to the user. The information for prompting a store visit includes information giving a direct guide to the store. The information for promoting a store visit includes not only the information for directly prompting a store visit but also information for inducing a user's visit to the store. The information for promoting a store visit includes, for example, information that raises expectation for some benefit given by the store visit.

As shown in FIG. 1, the informing device G1 is provided in the vehicle V. The informing device G1 is formed integrally with the vehicle V. The informing device G1 is arranged in a position that allows the user to recognize the store visit promotion operation. For example, the informing device G1 is arranged in a vehicle speed display device.

FIG. 4 is a diagram showing an example of information provided by the informing device G1.

Upon receiving the store visit promotion signal from the store visit promotion signal output unit 153, the informing device G1 displays a figure for promoting a store visit, as shown in FIG. 4. The figure shown in FIG. 4 expresses a vehicle going to a store. The figure shown in FIG. 4 prompts the user to visit a store.

FIG. 5 is a block diagram showing a configuration of the informing device G2 that is provided separately from the vehicle V.

The informing device G2 is, for example, a mobile phone owned by the user. The informing device G2 is a mobile terminal. The informing device G2 is communicable with the control device 15. The store visit promotion signal output unit 153 of the control device 15 outputs the store visit promotion signal to the informing device G2 by wireless communication.

The informing device G2 includes a control device 200, a promotion signal receiving unit 210, and a display device 220. The control device 200 includes a central processing unit (not shown) and a storage device (not shown). The control device 200 includes a position detection unit 201 and an output control unit 202 that are implemented by the central processing unit executing programs. The storage device implements a data storage unit 203. The informing device G2 also includes a position acquisition unit 230 and a data communication unit 240.

The promotion signal receiving unit 210 receives a signal from the control device 15 (see FIG. 2) of the unit P. The promotion signal receiving unit 210 receives the signal by wireless communication. The display device 220 displays information. The position acquisition unit 230 obtains present position information about the present position of the informing device G2. The position acquisition unit 230 is, for example, a receiver of a satellite positioning system. The satellite positioning system is not particularly limited. Examples of the satellite positioning system include a global positioning system. The data communication unit 240 exchanges data by wireless communication with a server apparatus (not shown) provided outside the informing device G2.

If the promotion signal receiving unit 210 receives the store visit promotion signal, the output control unit 202 of the control device 200 directs the display device 220 to display information for promoting a store visit.

Figure 6:
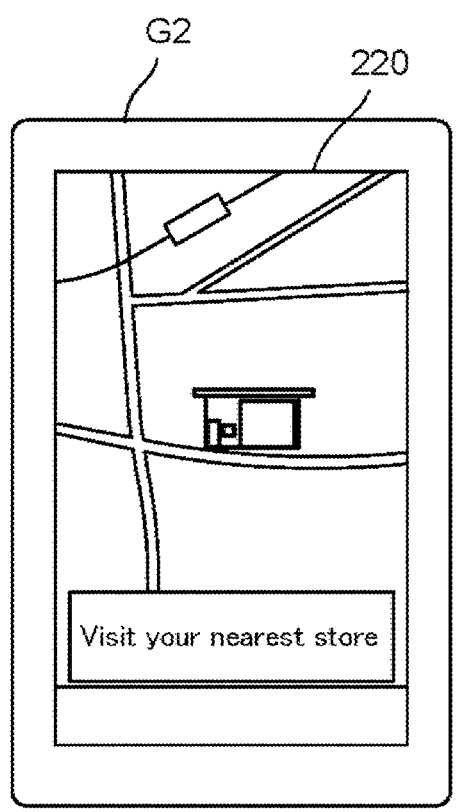
FIG. 6 is a diagram showing an example of information provided by the informing device shown in FIG. 5.

FIG. 6 is a diagram showing an example of information provided by the informing device G2 shown in FIG. 5.

The display device 220 of the informing device G2 displays a sentence for prompting a store visit. The display device 220 displays the sentence, "Visit your nearest store". The display device 220 also displays a map on which the store is indicated. The indicated store is a store where the unit P is replaceable. The message and the map displayed by the informing device G2 prompt the user to visit the store. Details of operations of respective parts of the informing device G2 is described later.

As described above, in response to the store visit promotion signal outputted from the control device 15 of the vehicle V to the informing devices G1, G2, the informing devices G1, G2 output information for prompting a visit to a store. User's motivation to visit a store is enhanced if the user obtains the information for prompting the store visit. The likelihood that the user visits the store with the vehicle V is increased. That is, the output of the informing devices promotes a visit to the store.

Since the vehicle V comes to the store, the unit P can be easily replaced. Accordingly, it is easy to replace the unit P when the engine 14 or the generator 10 (see FIG. 2) needs maintenance.

[Supply Current Adjustment Unit]

Figure 7A:
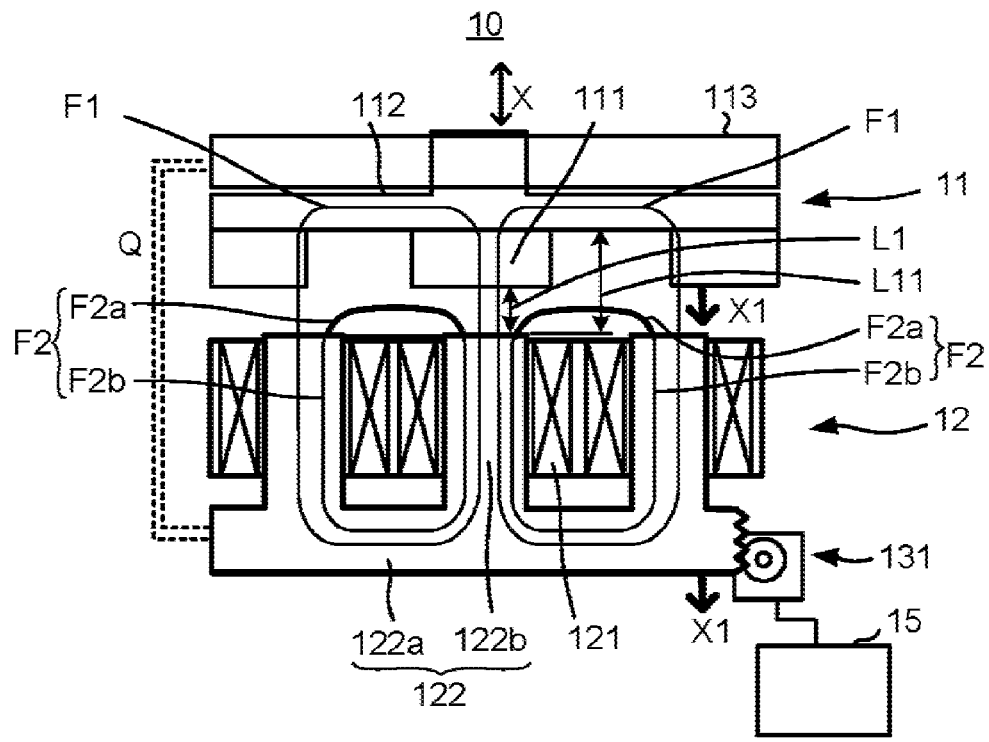
FIG. 7A is a schematic diagram for explanation of adjustment made by a supply current adjustment unit included in a generator shown in FIG. 2.
Figure 7B:
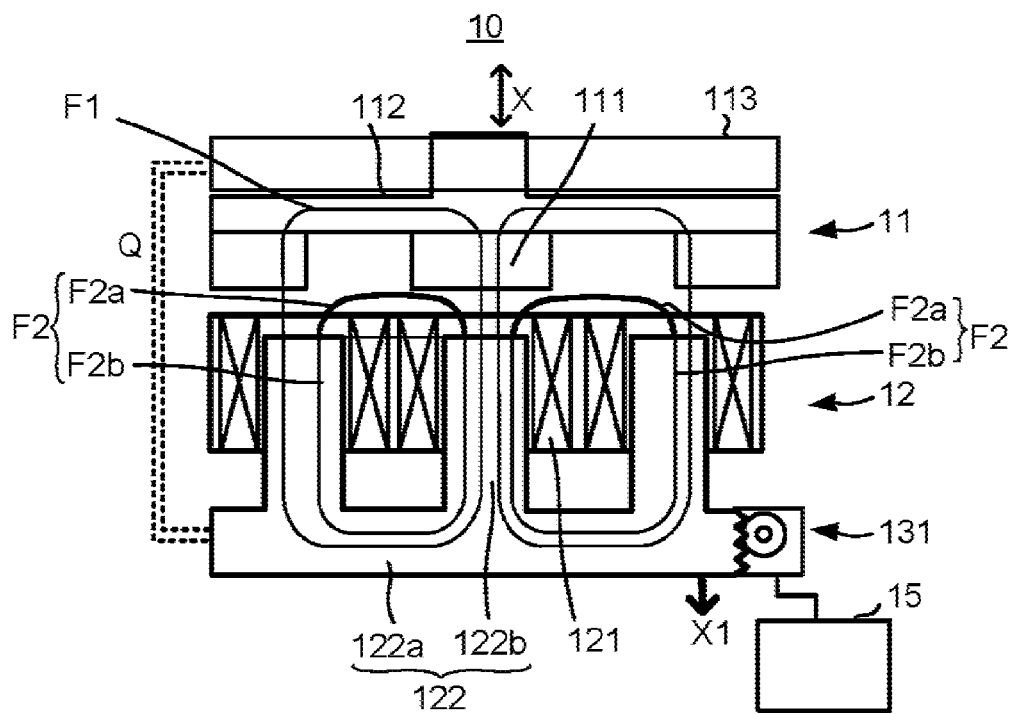
FIG. 7B is a schematic diagram showing a state in which the inductance of a winding is set lower than that of FIG. 7A.

FIG. 7A and FIG. 7B are schematic diagrams for explanation of adjustment made by the supply current adjustment unit 131 provided in the generator 10 shown in FIG. 2. FIG. 7A shows a state in which the inductance of the winding 121 is set to the highest settable value. FIG. 7B shows a state in which the inductance of the winding 121 is set to a value lower than that of FIG. 7A.

FIG. 7A illustrates a part of the rotor 11 and a part of the stator 12 provided in the generator 10. The rotor 11 and the stator 12 are opposite to each other. The generator 10 of this embodiment includes an SPM (Surface Permanent Magnet)

generator. More specifically, the magnetic pole parts 111 of the rotor 11 and the teeth 122b of the stator core 122 of the stator 12 are opposite to each other with the air gap therebetween. The magnetic pole parts 111 are exposed to the stator 12.

The supply current adjustment unit 131 changes the magnetic resistance of a magnetic circuit F22 for the winding 121, which passes through the stator core 122. In this manner, the supply current adjustment unit 131 changes the inductance of the winding 121, to adjust the current to be supplied to the motor 18. In more detail, the supply current adjustment unit 131 moves the position of the stator core 122 relative to the winding 121. This is how the supply current adjustment unit 131 changes the magnetic resistance of the magnetic circuit F22 for the winding 121, which passes through the stator core 122.

The windings 121 are secured to a casing (not shown) of the generator 10. The stator core 122 is supported on the casing such that the stator core 122 is freely movable in the axial direction X relative to the windings 121. The windings 121 are not secured to the teeth 122b. A gap is ensured between each winding 121 having a cylindrical shape and each tooth 122b. The gap is to such an extent that the tooth 122b is freely movable relative to the winding 121.

The supply current adjustment unit 131 moves the stator core 122 so as to move the teeth 122b in a direction into and out of the cylindrically wound windings 121. In this embodiment, the supply current adjustment unit 131 moves the stator core 122 in the axial direction X. The control device 15 operates the supply current adjustment unit 131 in accordance with the current request.

In FIGS. 7A and 7B, for the purpose of describing the movement of the stator core 122 in an easy-to-understand manner, the supply current adjustment unit 131 is schematically illustrated in the form of a rack-and-pinion mechanism and a motor. Here, mechanisms other than the illustrated one are adoptable as the supply current adjustment unit 131 that moves the stator core 122. For example, a mechanism including a cylindrical member that is arranged concentric with a stator core in threaded engagement with the stator core is adoptable. Such a mechanism moves the stator core in the axial direction X by, for example, rotating the cylindrical member relative to the stator core.

The supply current adjustment unit 131 moves the position of the stator core 122 relative to the winding 121 while maintaining the position of the stator core 122 relative to the rotor 11. In FIGS. 7A and 7B, the broken lines Q express that the rotor 11 moves in conjunction with the stator core 122 in the axial direction X. A structure for maintaining the relative position between the rotor 11 and the stator core 122 is implemented by, for example, a bearing part 113 rotatably supporting the rotor 11. The position of the bearing part 113 is fixed relative to the stator core 122.

FIG. 7A and FIG. 7B illustrate primary magnetic fluxes F1 generated by the magnetic pole parts 111. The line of each magnetic flux F1 represents a primary magnetic circuit through which the magnetic flux F1 generated by the magnetic pole part 111 flows. The magnetic circuit through which the magnetic flux F1 flows is referred to as a magnetic circuit F1.

The primary magnetic flux F1 generated by the magnetic pole part 111 flows through the magnetic pole part 111, the air gap between the magnetic pole part 111 and the tooth 122b, the tooth 122b, the core main body 122a, and the back yoke part 112. In other words, the magnetic circuit F1 is made up of the magnetic pole part 111, the air gap between the magnetic pole part 111 and the tooth 122b, the tooth 122b, the core main body 122a, and the back yoke part 112.

Here, FIG. 7A and FIG. 7B show three teeth 122b among the plurality of teeth 122b arranged in the circumferential direction. For providing plain illustration of the magnetic circuits F1, FIG. 7A and FIG. 7B show a state in which the magnetic pole part 111 is opposite to the middle tooth 122b among the three teeth 122b.

As the rotor 11 rotates, the amount of magnetic flux generated by the magnetic pole part 111 and linked with the winding 121 changes. The change of the amount of magnetic flux linked with the winding 121 causes an induced voltage to occur in the winding 121. That is, power is generated.

The induced voltage caused in the winding 121 depends on the amount of magnetic flux linked with the winding 121. The higher the magnetic resistance of the magnetic circuit F1 is, the smaller the amount of magnetic flux linked with the winding 121 is. The magnetic resistance of the magnetic circuit F1 depends mainly on the magnetic resistance of the air gap between the tooth 122b and the magnetic pole part 111. The magnetic resistance of the air gap between the tooth 122b and the magnetic pole part 111 depends on an air gap length L1 of the air gap between the tooth 122b and the magnetic pole part 111.

Accordingly, the induced voltage caused in the winding 121 depends on the air gap length L1 of the air gap between the tooth 122b and the magnetic pole part 111.

FIG. 7A and FIG. 7B illustrate a primary magnetic flux F2 generated by a current flowing in the winding 121. At a time of power generation, a current caused by the induced voltage flows in the winding 121. The magnetic flux F2 is generated by the current flowing in the winding 121 at the time of power generation. The line of each magnetic flux F2 represents a primary magnetic circuit through which the magnetic flux F2 generated by the current in the winding 121 flows. The magnetic circuit through which the magnetic flux F2 flows is referred to as a magnetic circuit F2. The magnetic circuit F2 is the magnetic circuit for the winding 121. The magnetic circuit F2 for the winding 121 is made up of a path passing through the inside of the winding 121 and providing the minimum magnetic resistance of the entire magnetic circuit F2.

The magnetic circuit F2 passes through the stator core 122. The magnetic circuit F2 passes through adjacent teeth 122b. In the drawing, three teeth 122b among the plurality of teeth 122b arranged in the circumferential direction are shown. The magnetic circuit F2 for the winding 121 wound on the middle tooth 122b among the three teeth 122b is illustrated as a typical example. A magnetic circuit F2 for a certain winding 121 passes through a tooth 122b having the certain winding 121 wound thereon and two teeth 122b adjacent to the certain tooth 122b.

The primary magnetic flux F2 generated by the current in the winding 121 flows through the teeth 122b, the core main body 122a, and the air gap between the two adjacent teeth 122b. In other words, the magnetic circuit F2 is made up of the teeth 122b, the core main body 122a, and the air gap between the two adjacent teeth 122b. The magnetic circuit F2 passing through the stator core 122 includes one air gap. A portion of the magnetic circuit F2 including the air gap is indicated by the bold line. The bold-line portion of the magnetic circuit F2 including the air gap is simply referred to as an air gap F2a. The air gap F2a exists between the winding 121 and the rotor 11. The air gap F2a included in the magnetic circuit F2 exists between the winding 121 and the rotor 11 and between the adjacent teeth 122b. The air gap F2a is a non-magnetic gap. A portion of the magnetic circuit F2 corresponding to the air gap F2a is provided so as to connect respective portions of the two adjacent teeth 122b opposite to the rotor 11.

The magnetic circuit F2 for the winding 121 includes the air gap F2a between the two adjacent teeth 122b. The magnetic circuit F2 does substantially not include the back yoke part 112 of the rotor 11. Most of the magnetic flux F2 generated by the current in the winding 121 flows through the air gap between the two adjacent teeth 122b without going to the back yoke part 112 of the rotor 11, for the following reasons.

For the magnetic flux F2 generated by the current in the winding 121, the magnetic pole part 111 is considered simply as a magnetic flux path. In this embodiment, the magnetic pole part 111 is made of a permanent magnet whose magnetic permeability is as low as air. The magnetic pole part 111 can therefore be considered as equivalent to air for the magnetic circuit F2. Since the magnetic pole part 111 is equivalent to air, the substantial air gap length of the air gap between the stator 12 and the rotor 11 is equal to a distance L11 from the tooth 122b to the back yoke part 112. The distance L11 from the tooth 122b to the back yoke part 112 includes the thickness of the magnetic pole part 111 with respect to the axial direction X. Thus, the distance L11 is longer than a distance L1 from the tooth 122b to the magnetic pole part 111.

In this embodiment, moreover, the amount of the magnetic flux F2 generated by the current in the winding 121 is smaller than the amount of magnetic flux generated by the permanent magnet of the magnetic pole part 111. Most of the magnetic flux F2 generated by the current in the winding 121 is less likely to reach the back yoke part 112 across the air gap length L11. Little of the magnetic flux F2 generated by the current in the winding 121 flows through the back yoke part 112.

Thus, most of the magnetic flux F2 generated by the current in the winding 121 flows through the air gap F2a between the teeth 122b rather than through the back yoke part 112 of the rotor 11. In the state shown in FIG. 7(A), the inductance of the winding 121 is set to the highest settable value. In the state shown in FIG. 7(A), the air gap F2a included in the magnetic circuit F2 has the highest magnetic resistance among portions of the magnetic circuit F2. The air gap F2a has a higher magnetic resistance than that of a remaining portion F2b of the magnetic circuit F2 other than the air gap F2a.

The inductance of the winding 121 depends on the magnetic resistance of the magnetic circuit F2 for the winding 121. The inductance of the winding 121 is in reverse proportion to the magnetic resistance of the magnetic circuit F2 for the winding 121.

Here, the magnetic resistance of the magnetic circuit F2 for the winding 121 is the magnetic resistance of the magnetic circuit F2 through which the magnetic flux F2 generated by the current in the winding 121 flows. The magnetic resistance of the stator core 122, which is the magnetic resistance for the winding 121, includes the magnetic resistance of the air gap F2a between the two adjacent teeth 122b. In a strict sense, the magnetic flux F2 generated by the current in the winding 121 flows through both the stator 12 and the rotor 11. As described above, however, most of the magnetic flux generated by the current in the winding 121 flows through the air gap F2a between the two adjacent teeth 122b without going to the back yoke part 112 of the rotor 11. Therefore, the magnetic resistance to the winding 121 depends more strongly on the magnetic resistance of the magnetic circuit F2 passing through the stator 12 than on the magnetic resistance of the magnetic circuit F1 passing through the rotor 11. That is, the inductance of the winding 121 depends more strongly on the magnetic resistance of the magnetic circuit F2, which passes through the stator core 122 when viewed from the winding 121 side, than on the magnetic resistance of the magnetic circuit F1, which passes through the rotor 11 when viewed from the winding 121 side. Accordingly, the inductance of the winding 121 substantially depends on the magnetic resistance of the magnetic circuit F2, which passes through the stator core 122 when viewed from the winding 121 side.

The supply current adjustment unit 131 moves the position of the stator core 122 relative to the windings 121. In this manner, the supply current adjustment unit 131 changes the magnetic resistance of the magnetic circuit F2 for the winding 121. This is how the supply current adjustment unit 131 changes the inductance of the winding 121. For example, in a case of the supply current adjustment unit 131 moving the stator core 122 in a direction indicated by the arrow X1, the teeth 122b of the stator core 122 are moved in the direction out of the cylindrically wound windings 121.

FIG. 7B shows a state having a lower inductance than that of the state shown in FIG. 7A.

Since the teeth 122b of the stator core 122 are moved out of the windings 121, the volume of the stator core 122 existing within the windings 121 is reduced. As a result, the magnetic flux within the winding 121 spreads. From the viewpoint of the magnetic circuit F2 for the winding 121, the length of the air gap F2a constituting the magnetic circuit F2 increases. This increases the magnetic resistance of the air gap F2a existing between the winding 121 and the rotor 11. That is, the magnetic resistance of the air gap F2a, whose magnetic resistance is highest, increases. As a result, the magnetic resistance of the magnetic circuit F2 for the winding 121, which passes through the stator core 122, increases. Consequently, the inductance of the winding 121 decreases.

The supply current adjustment unit 131 changes the magnetic resistance of the air gap F2a whose magnetic resistance is highest. Thus, the supply current adjustment unit 131 changes the magnetic resistance of the magnetic circuit F2 passing through the adjacent teeth 122b. This can cause a larger change of the inductance of the winding 121 as compared with, for example, changing the magnetic resistance of a portion other than the air gap F2a.

Furthermore, the supply current adjustment unit 131 changes the inductance of the winding 121 such that the change rate of the inductance of the winding 121 is higher than the change rate of the magnetic flux linked with the winding 121. This is how the supply current adjustment unit 131 adjusts the current. The supply current adjustment unit 131 of the generator 10 according to this embodiment moves the position of the stator core 122 relative to the windings 121 while maintaining the position of the stator core 122 relative to the rotor 11.

As the supply current adjustment unit 131 moves the stator core 122 in the direction of the arrow X1, the rotor 11 is accordingly moved in the direction of the arrow X1. Therefore, the position of the stator core 122 relative to the rotor 11 is maintained. This can suppress a change of the air gap length L1 between the teeth 122b and the magnetic pole parts 111, which otherwise might be caused by movement of the stator core 122. Accordingly, a change of the magnetic flux F1 flowing from the magnetic pole part 111 to the stator core 122 is suppressed. That is, a change of the magnetic flux F1 linked with the winding 121 is suppressed.

Figure 8:
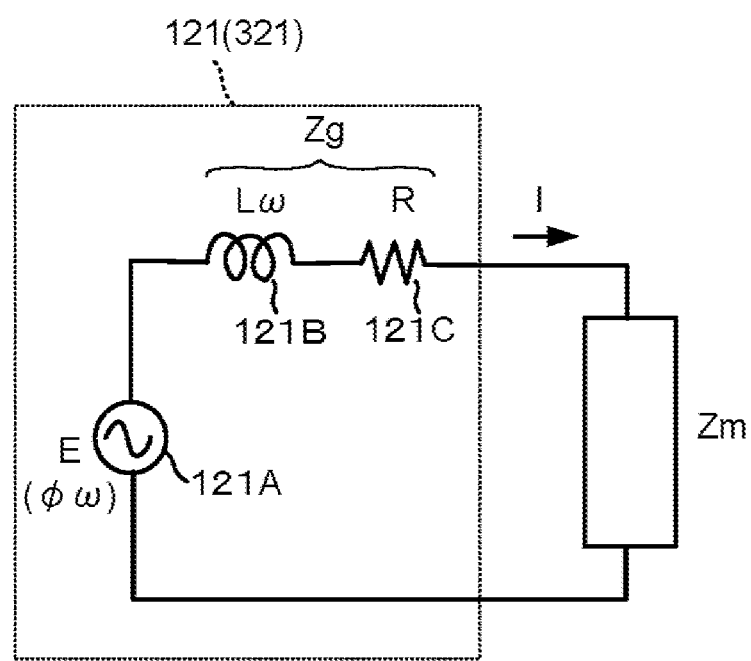
FIG. 8 is a circuit diagram schematically showing an equivalent circuit of the winding of the generator shown in FIGS. 7A and 7B.

FIG. 8 is a circuit diagram schematically showing an equivalent circuit of the winding 121 of the generator 10 shown in FIGS. 7A and 7B.

The circuit depicted in FIG. 8 is simplified for the purpose of outlining a change of the voltage and current generated by the generator 10. In addition, illustration of the electric power output unit 16 and the inverter 17 is omitted on the assumption that their states are fixed.

As shown in FIG. 8, the winding 121 in an electrical sense includes an AC voltage source 121A, an inductor 121B, and a resistance 121C.

The AC voltage source 121A outputs an induced voltage E which depends mainly on a magnetic flux $\Phi$ linked with the winding 121. More specifically, the induced voltage E depends on the product of the magnetic flux F1 and the rotation speed $\omega$ of the rotor 11. An inductance L of the inductor 121B depends mainly on the magnetic resistance of the stator core 122 for the winding 121. A resistance value $\omega$ of the resistance 121C is a winding resistance. Impedance Zg of the winding 121 is schematically expressed as $((\omega L)^2 + R^2)^{1/2}$.

The supply current adjustment unit 131 moves the position of the stator core 122 relative to the winding 121 in accordance with the torque request which corresponds to the current request. Thus, the supply current adjustment unit 131 changes the magnetic resistance of the magnetic circuit F2 for the winding 121, which passes through the stator core 122. Thus, the supply current adjustment unit 131 changes the inductance L of the winding 121. The change of the inductance L leads to a change of the impedance Zg. A current I to be supplied from the generator 10 is adjusted in this manner.

The supply current adjustment unit 131 changes the inductance of the winding 121 such that the change rate of the magnetic flux $\Phi$ linked with the winding 121 is lower than the change rate of the inductance L of the winding 121. The supply current adjustment unit 131 adjusts the current I in this manner. Accordingly, the current is adjusted with less change of the induced voltage E.

Instead of making adjustment by the supply current adjustment unit 131, changing the output (rotational power) of the engine 14 is also conceivable as a method for adjusting the current to be outputted from the generator 10.

The engine output adjustment unit 141 changes the rotation speed of the engine 14, to change the rotation speed $\omega$ of the rotor 11, so that the voltage to be supplied to the motor 18 is adjusted.

The output (rotational power) of the engine 14 mainly changes the rotation speed of the output shaft C, that is, the rotation speed $\omega$ of the rotor 11. The rotation speed $\omega$ of the rotor 11 influences both the induced voltage E of the winding 121 and the impedance $((\omega L)^2 + R^2)^{1/2}$. Therefore, adoption of only the method of changing the rotation speed of the output shaft C of the engine 14 cannot avoid high interaction between the supply voltage and the supply current.

In this respect, the generator 10 moves the position of the stator core 122 relative to the winding 121 in accordance with the current request, to change the magnetic resistance of the magnetic circuit F2 for the winding 121, which passes through the stator core 122. As a result, the inductance of the winding 121 is changed. Therefore, the ratio of a current change to a voltage change obtained when changing the magnetic resistance of the magnetic circuit F2 for the winding 121 is different from that obtained when changing the rotation speed $\omega$ of the rotor 11. Accordingly, the generator 10 of this embodiment is able to adjust the current to be supplied to the motor 18 with less interaction between the voltage change and the current change as compared with when, for example, only the rotation speed of the output shaft C of the engine 14 is changed by the engine output adjustment unit 141.

In this embodiment, a movement of the position of the stator core 122 relative to the winding 121 causes a change of the magnetic resistance of the magnetic circuit F2 for the winding 121. As a result, the inductance L of the winding 121 is changed, so that the current is adjusted. This embodiment can gradually change the inductance L because the change of the inductance L is implemented by a change of the magnetic resistance of the magnetic circuit F2 for the winding 121, which passes through the stator core 122.

Instead of changing the magnetic resistance of the magnetic circuit for the winding which passes through the stator core, changing the substantial number of turns of the winding is also conceivable as a method for changing the inductance. For example, it is conceivable that a terminal provided at an end of the winding and a terminal provided in the middle of the winding are selectively switched for use as a current output terminal. It is also conceivable that a terminal provided in the middle of the winding is short-circuited to another terminal. This changes the substantial number of turns which affect the current. As a result, the inductance is changed.

Here, in a case of changing the substantial number of turns of the winding, such a change of the substantial number of turns is caused significantly and instantaneously. Therefore, an excessive voltage occurs in the winding. In addition, an excessive current is likely to flow in a short time. In a case of changing the substantial number of turns, it is required that a switching element for switching the current is provided. Furthermore, the switching element needs to have a high breakdown voltage in order to withstand the excessive voltage. The winding needs to be made of a thick wire in order to deal with a change of the excessive current. For these reasons, changing the substantial number of turns of the winding is less efficient. In addition, it involves a size increase of the generator.

In this embodiment, the magnetic resistance of the stator core 122 is changed, so that the inductance L of the winding 121 is changed. Thus, the inductance L of the winding 121 can be changed gradually. This can suppress a rapid increase of the voltage occurring in the winding 121. It is therefore possible that a component having a low breakdown voltage is connected to the generator 10. This provides a high efficiency. This also eliminates the need to provide the switching element for switching the current. This also allows use of a relatively thin wire for the winding. A size increase of the generator 10 is suppressed.

[Operation of Vehicle V]

Figure 9:
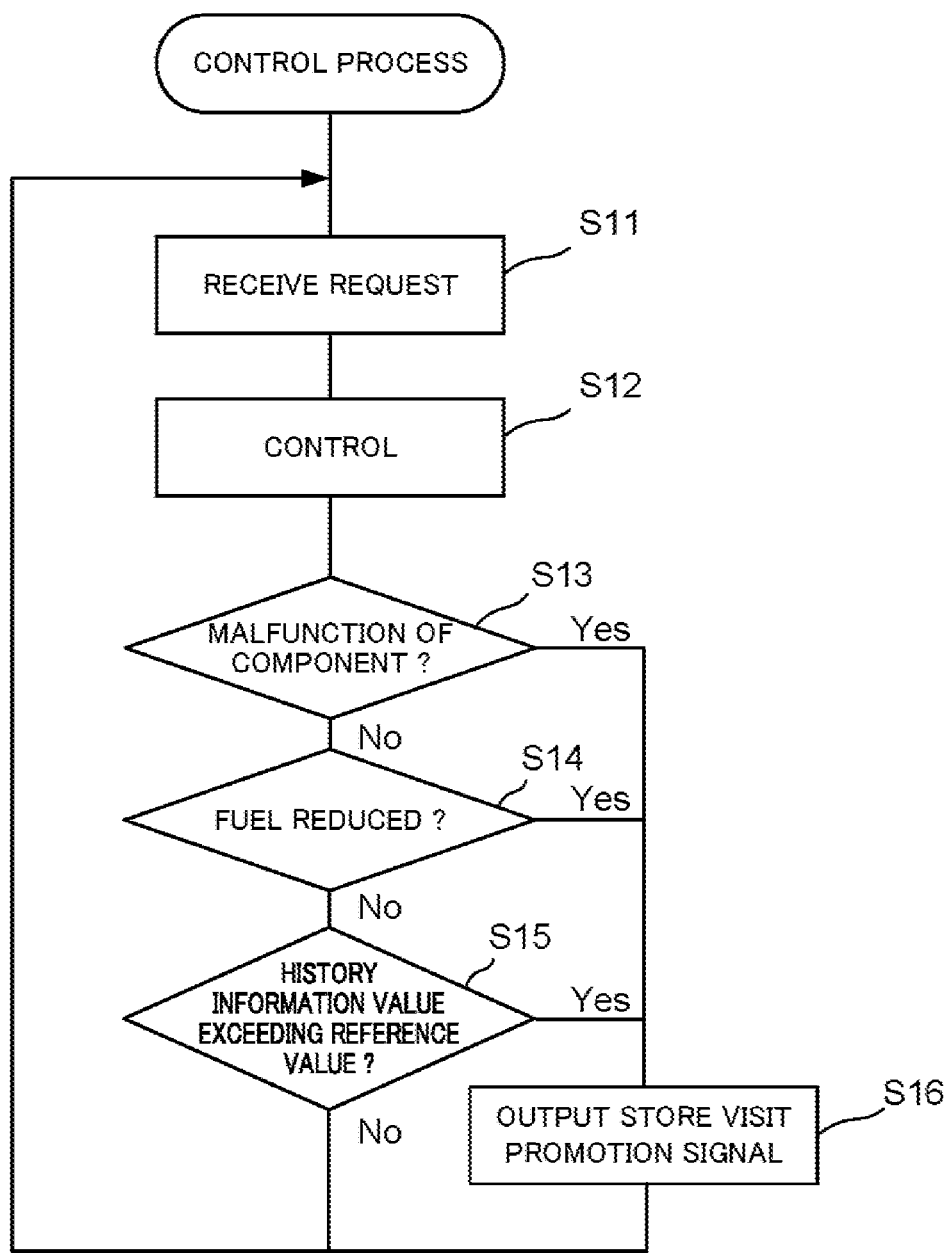
FIG. 9 is a flowchart of an operation of the vehicle.

FIG. 9 is a flowchart of an operation of the vehicle V.

Rotational power outputted to the drive wheel Wr is controlled by the control device 15 performing a control process. The control device 15 repeats the control process shown in FIG. 9.

The torque request receiving unit 151 of the control device 15 receives a request for rotational power (S11). The request for rotational power includes a torque request and a rotation speed request.

To be specific, the torque request receiving unit 151 receives the amount of operation of the request indication unit A. The torque request receiving unit 151 obtains the state of traveling of the vehicle V. The state of traveling of the vehicle V includes the state of traveling of the vehicle V itself. The state of traveling of the vehicle V includes, for example, setting of the economical driving and/or setting of the followability of the output of the motor 18 to an operation of the accelerator. These settings are set by a setting unit (not shown) being operated. The torque request receiving unit 151 obtains the request for rotational power based on the amount of operation of the request indication unit A and the state of traveling of the vehicle V.

Then, the power generation control unit 152 controls rotational power to be outputted from the motor 18 based on the request for rotational power received by the torque request receiving unit 151 (S12). The power generation control unit 152 controls the supply current adjustment unit 131 and the engine output adjustment unit 141 in accordance with the received request for rotational power. More specifically, the power generation control unit 152 controls the torque and the rotation speed to be outputted from the motor 18, based on the request for rotational power received by the torque request receiving unit 151. The power generation control unit 152 adjusts the current supplied to the motor 18, thus controlling the torque to be outputted from the motor 18. Upon a request for increasing the torque, the power generation control unit 152 performs a control so as to increase the torque to be outputted from the motor 18. The power generation control unit 152 controls the torque and the rotation speed to be outputted from the motor 18.

The power generation control unit 152 controls the amount of adjustment made by the supply current adjustment unit 131 and the amount of adjustment made by the engine output adjustment unit 141. The power generation control unit 152 controls a distribution between the amount of adjustment made by the supply current adjustment unit 131 and the amount of adjustment made by the engine output adjustment unit 141.

The power generation control unit 152 controls a distribution between the amount of increase of the torque to be outputted from the motor 18 and the amount of increase of the rotation speed. As for the control performed by the power generation control unit 152, a typical example of a control with a large amount of increase of the torque and a typical example of a control with a large amount of increase of the rotation speed is described. The typical example of the control with a large amount of increase of the torque will be referred to as a torque control. The typical example of the control with a large amount of increase of the rotation speed is referred to as a speed control. The power generation control unit 152 performs any of the torque control, the speed control, and a combination of the torque control and the speed control, in accordance with the request received.

(Speed Control)

In the speed control, the control device 15 increases the rotational power of the engine 14. More specifically, the control device 15 directs the engine output adjustment unit 141 to increase the amount of air taken in and the amount of fuel injected by the engine 14. The increase of the power of the engine 14 leads to an increase of the rotation speed of the engine 14 which means the rotation speed ω of the rotor 11 of the generator 10.

In the speed control, the control device 15 does not direct the supply current adjustment unit 131 to perform the adjustment for reducing the inductance L of the winding 121. The supply current adjustment unit 131 maintains the state in which the teeth 122b of the stator core 122 are completely received in the cylindrical shapes of the windings 121, as shown in FIGS. 7A and 7B.

As the rotation speed ω increases, the induced voltage E of the AC voltage source 121A shown in FIG. 8 increases. The induced voltage E is substantially in proportion to the rotation speed ω. This results in an increase of the voltage outputted from the unit P. That is, the voltage supplied to the motor 18 increases. As a consequence, the rotation speed of the motor 18 increases.

(Torque Control)

In the torque control, the control device 15 directs the supply current adjustment unit 131 to adjust the position of the stator core 122 so as to reduce the inductance L of the winding 121. The supply current adjustment unit 131 adjusts the position of the stator core 122 so as to increase the magnetic resistance of the magnetic circuit F2 for the winding 121, which passes through the stator 12. In this embodiment, the supply current adjustment unit 131 moves the stator core 122 such that the teeth 122b of the stator core 122 are moved into and out of the cylindrical shapes of the windings 121 shown in FIG. 7. As a result, the inductance L of the winding 121 decreases.

In the unit P, the control device 15 directs the supply current adjustment unit 131 to adjust the magnetic resistance of the magnetic circuit F2 for the winding 121 in accordance with the torque request. The control device 15 directs the supply current adjustment unit 131 to adjust the magnetic resistance of the magnetic circuit F2 for the winding 121 in accordance with the current request corresponding to the torque request. In this manner, the supply current adjustment unit 131 changes the inductance of the winding 121. This is how to control the current to be supplied to the motor 18 serving as an electrical load device.

In the engine generator unit P, for example, the control device 15 directs the supply current adjustment unit 131 to increase the magnetic resistance of the magnetic circuit F2 for the winding 121, in accordance with a request for increasing the torque. The control device 15 directs the supply current adjustment unit 131 to increase the magnetic resistance of the magnetic circuit F2 for the winding 121, in accordance with a request for increasing the current, which corresponds to a request for increasing the torque. Thus, the supply current adjustment unit 131 reduces the inductance of the winding 121. This can increase the current to be supplied to the motor 18 serving as the electrical load device.

The supply current adjustment unit 131 changes the inductance of the winding 121 by changing the magnetic resistance of the air gap F2a existing between the winding 121 and the rotor 11. The magnetic pole parts 111 moving along with rotation of the rotor 11 cause an alternating magnetic field to occur between the windings 121 and the rotor 11. For example, reducing the magnetic resistance of the air gap F2a existing between the winding 121 and the rotor 11 leads to a reduction of an alternating magnetic field loss. To be exact, a core loss in the magnetic circuit F2 passing through the air gap F2a is reduced. The reduction of the loss enables a large current to be outputted. Accordingly, the current to be supplied to the motor 18 serving as the electrical load device can be adjusted to an increased degree.

In the torque control, the control device 15 directs the engine output adjustment unit 141 (FIG. 2) to increase the rotational power of the engine 14. More specifically, the control device 15 directs the engine output adjustment unit 141 to increase the amount of air taken in and the amount of fuel injected by the engine 14. The increase of the rotational power of the engine 14 leads to an increase of the rotation speed of the engine 14 which means the rotation speed ω of the rotor 11 of the generator 10.

As the rotation speed ω increases, the induced voltage E of the AC voltage source 121A increases. The induced voltage E is substantially in proportion to the rotation speed ω. The increase of the induced voltage E results in an increase of the current outputted from the generator 10. That is, the current supplied to the motor 18 increases. As a result, the torque of the motor 18 increases.

The control device 15 performs the control by using, for example, a map in which the inductance, the rotation speed of the rotor 11, and the output current are stored in association with one another. The map is obtained based on the following relationships (i) and (ii), for example. The relationship (i) is the relationship between the rotation speed of the engine 14 and the input current of the motor 18. The relationship (ii) is the relationship between the torque and the rotation speed of the motor 18. The relationship (i) is specified or set based on, for example, measurement or simulation of the generator 10 which has been preliminarily conducted with respect to a plurality of conditions of the inductance L. The relationship (i) includes the relationship between the rotation speed and the output current of the generator 10, for example. The relationship (i) also includes an influence of the operations of the electric power output unit 16 and the inverter 17. The relationship (ii) is specified or set based on, for example, a result of measurement or simulation of the motor which has been preliminarily conducted.

For example, the control device 15 determines, as a target, the input current of the motor 18 corresponding to the requested torque of the motor 18. For example, the control device 15 controls the supply current adjustment unit 131 so as to obtain the inductance L that allows the target current to be supplied at the minimum rotation speed of the generator 10.

The control device 15 operates the engine 14 at such a rotation speed that allows the target current to be supplied under the condition of the inductance L obtained. In a case where the current and the voltage are limited by the electric power output unit 16 and the inverter 17, the rotation speed is adjusted based on an influence of the limiting.

Here, it may be acceptable that the control device 15 controls the supply current adjustment unit 131 without using the map. For example, the control performed by the control device 15 may be based on a result of computation of expressions.

The control device 15 is configured to control both the supply current adjustment unit 131 and the engine output adjustment unit 141. The control device 15 directs the supply current adjustment unit 131 to reduce the inductance of the winding 121 while directing the engine output adjustment unit 141 to increase the rotational power of the engine 14.

Preferably, an entire period in which the supply current adjustment unit 131 reduces the inductance of the winding 121 has an overlap with an entire period in which the engine output adjustment unit 141 increases the rotational power of the engine 14. Preferably, a period in which the supply current adjustment unit 131 is reducing the inductance of the winding 121 has an overlap with a period in which the engine output adjustment unit 141 is increasing the rotational power of the engine 14.

In this embodiment, upon a request for increasing the torque, the engine 14 increases the rotational power of its output shaft C by means of the adjustment made by the engine output adjustment unit 141. As a result, the rotation speed ω of the rotor 11 of the generator 10 increases. On the other hand, the generator 10 reduces the inductance L of the winding 121 by means of the adjustment made by the supply current adjustment unit 131. As a result, an increase of the impedance Zg of the winding 121, which depends on the product of the rotation speed ω and the inductance L, is suppressed. This provides a greater increase of the current outputted from the generator 10 as compared with when, for example, the inductance L of the winding 121 is not reduced. Accordingly, a greater increase of the torque outputted from the motor 18 is obtained as compared with when, for example, the inductance L of the winding 121 is not reduced.

In the generator 10 of this embodiment, the supply current adjustment unit 131 reduces the inductance L of the winding 121 in response to a request for increasing the torque. As a result, an increase of the impedance Zg of the winding 121 is suppressed. This allows a greater increase of the output torque of the motor 18 to be obtained from the increase of the rotational power of the engine 14 as compared with when, for example, the inductance L is not reduced. In this manner, an excessive increase of the rotational power of the engine 14 in response to a request for increasing the torque is suppressed. This improves the fuel efficiency. Also, an excessive increase of the output voltage is suppressed. This allows adoption of a switching element with a low breakdown voltage, whose on-resistance is low. Accordingly, a high efficiency is obtained.

Thus, the vehicle V of this embodiment is able to make adjustment responsive to a request for increasing the torque with suppression of a decrease in fuel efficiency.

Step S13 and subsequent steps in FIG. 9 are described.

After controlling the rotational power in step S12 as described above, the control device 15 determines whether conditions for outputting the store visit promotion signal are satisfied (S13 to S15). If the conditions are satisfied (Yes in any step of S13 to S15), the control device 15 outputs the store visit promotion signal to the informing devices G1, G2 (S16).

The control device 15 outputs the store visit promotion signal while the unit P is mounted on the vehicle body D. Whether the unit P is mounted on the vehicle body D is determined based on, for example, connection of the request indication unit A to the control device 15. It may be acceptable that the control device 15 sometimes outputs the store visit promotion signal while the unit P is not mounted on the vehicle body D.

The control device 15 is configured to output the store visit promotion signal at least in a situation where the electric power output unit 16 is outputting electric power to the electromotive driving unit 19 while the unit P is mounted on the vehicle body D. In this configuration, the store visit promotion signal is likely to be outputted when the user is driving the vehicle V. The user, therefore, can be efficiently prompted to visit the store S. The control device with this configuration may output the store visit promotion signal also in a situation where the electric power output unit 16 is not outputting electric power to the electromotive driving unit 19.

The conditions in steps S13 to S15 are set such that a timing when the store visit promotion signal is outputted can be included in a period during which the generator 10 generates electric power. The period during which the generator 10 generates electric power is a period during which the engine 14 drives the generator 10. Thus, the store visit promotion signal is outputted while the engine 14 is causing the generator 10 to generate electric power.

In step S13, the control device 15 determines whether there is any functional abnormality of components included in the engine 14. The detection unit 154 determines whether there is any abnormality based on results of detection made by the sensors provided in the engine 14.

For example, a functional abnormality of components included in the engine 14 is determined based on the following information (A) to (D).

(A) The engine rotation speed detected by the crank angle sensor 14*a*.
(B) The intake pressure detected by the intake pressure sensor 14*b*.
(C) The oxygen concentration detected by the oxygen concentration sensor 14*c*.
(D) The engine temperature detected by the engine temperature sensor 14*d*.

The detection unit 154 determines a functional abnormality of a corresponding component based on the following information (E) to (O).

(E) A signal of the crank angle sensor 14*a*.
(F) A signal of the intake pressure sensor 14*b*.
(G) A signal of the oxygen concentration sensor 14*c*.
(H) A signal of the engine temperature sensor 14*d*.
(I) A signal of the cam angle sensor (not shown).
(J) A signal of the exhaust device (not shown).
(K) A signal of the air temperature sensor (not shown).
(L) A signal of the decompression solenoid (not shown).
(M) A signal of the ignition coil (not shown).
(N) A signal of the fuel injection device (not shown).
(O) A signal of the cooling fan (not shown).

The detection unit 154 uses at least one of the information (A) to (O), to determine whether there is any functional abnormality of components included in the engine 14.

The control device 15 outputs the store visit promotion signal to the informing device G1 based on the abnormality detection made by the detection unit 154. A visit to the store S is promoted accordingly. This can suppress occurrence of a situation in which an abnormality of the engine 14 worsens to a level that obstructs traveling of the vehicle V.

In step S14, the control device 15 determines whether the amount of liquid fuel in the fuel tank is less than a predefined reference value. The determination is made by using an output of the fuel sensor (not shown).

A state in which the amount of fuel in the fuel tank is small is not a functional abnormality or malfunction. The store visit promotion signal is outputted when the amount of fuel is small, so that visiting the store S before a functional abnormality or malfunction occurs is promoted. This can increase the probability that any abnormality is recognized in the store's check and the unit P can be replaced in the store.

In step S15, the control device 15 determines whether the value of history information of the unit exceeds a predefined reference value.

The history information includes total history information and section history information. The total history information is the value accumulated from the start of use of a unit. The section history information is the value accumulated from when a unit is mounted on a vehicle body to when the unit is dismounted from the vehicle body.

The history information is the value concerning at least one of the following values.
(a) The cumulative elapsed time during which the unit has been mounted on the vehicle body D.
(b) The cumulative operating time of the engine 14.
(c) The cumulative number of rotations of the engine 14.
(d) The cumulative power generation of the generator 10.
(e) The cumulative travel distance of the vehicle V including the vehicle body D with the unit P mounted thereon.

The control device 15 determines, for example, the cumulative operating time of the engine 14, which has been accumulated from when a unit was mounted on the vehicle body to when the unit is dismounted from the vehicle body D. The control device 15 determines whether the cumulative operating time exceeds a reference value.

A state in which, for example, the value of the history information typified by the elapsed time exceeds a reference value is not a functional abnormality or malfunction. In such a state, the store visit promotion signal is outputted, so that a visit to the store S is promoted. This increases the probability that any abnormality is recognized in the store's check and the unit P can be replaced in the store.

If the condition is satisfied in the determination in steps S13 to S15 (Yes in any step of S13 to S15), the control device 15 outputs the store visit promotion signal (S16).

The control device 15 outputs the store visit promotion signal to the informing devices G1, G2 while the unit P is mounted on the vehicle body D. This causes the informing device G1 to output information for promoting a store visit, as shown in FIG. 4. This also causes the informing device G2 to output information for promoting a store visit.

The condition for outputting the store visit promotion signal is not limited to the conditions determined in steps S13 to S15 described above. It may be possible that the store visit promotion signal is outputted if another condition different from the conditions determined in steps S13 to S15 is satisfied. Alternatively, the determination of the condition for outputting the store visit promotion signal may be the determination of only part of steps S13 to S15.

Figure 10:
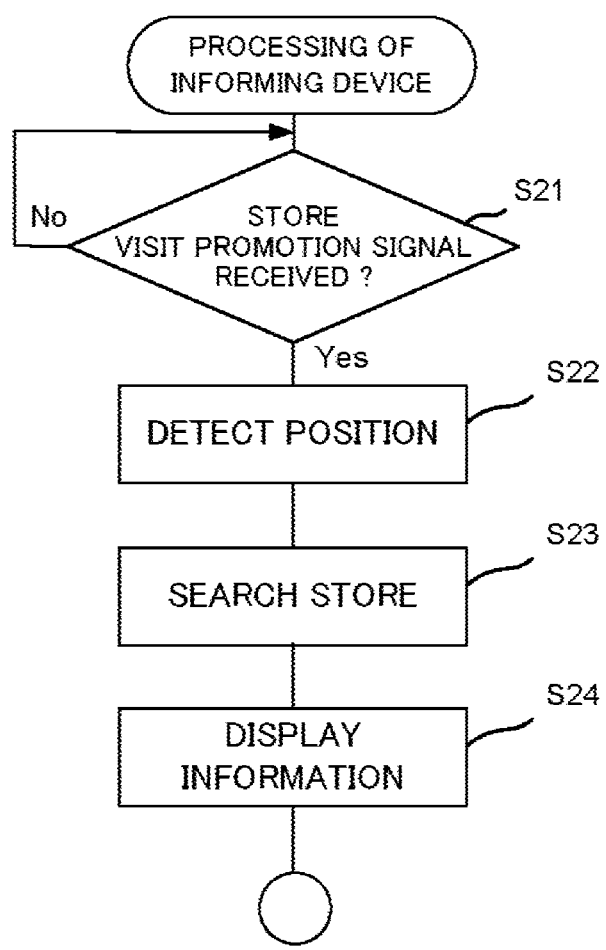
FIG. 10 is a flowchart of an operation of the informing device.

FIG. 10 is a flowchart of an operation of the informing device G2.

If the promotion signal receiving unit 210 of the informing device G2 receives a promotion signal (S21: Yes), the position detection unit 201 obtains position information from the position acquisition unit 230 (S22). The output control unit 202 searches store information for a store corresponding to the position indicated by the obtained position information (S23). The store information is stored in the data storage unit 203. The store information associates a store with the position of the store. The output control unit 202 obtains map data including the position of the corresponding store from the server apparatus (not shown) via the data communication unit 240. The map data may be stored in the data storage unit 203.

The control device 15 displays information (S24). More specifically, the output control unit 202 transmits the obtained map data to the display device 220. The display device 220 displays a map according to the data. The output control unit 202 causes a store's figure to be displayed at a position on the map, the position corresponding to the position information of the store. The output control unit 202 directs the display device 220 to display a sentence for promoting a visit to the store.

As a result, the informing device G2 displays information for promoting a visit to a store where the unit P is replaceable, as shown in FIG. 6.

The position data of the store may be obtained from the server apparatus via the data communication unit 240. The informing device G2 may output sound information for promoting a visit to the store.

Since the informing devices G1, G2 output the information for promoting a visit to the store, the user's visit to the store is promoted. Accordingly, a visit to the store is promoted.

Since the vehicle V comes to the store, the unit P can be easily replaced if the engine 14 or the generator 10 needs maintenance, as shown in FIG. 3.

The control device 15 outputs the store visit promotion signal under a state where the engine 14 does not have such an abnormality that prevents the engine 14 from causing power generation of the generator 10. The user's visit to the store is promoted. This can suppress occurrence of a situation in which traveling of the vehicle V is obstructed by an abnormality of the engine 14 or the generator 10. In addition, the frequency of maintenance is increased, which suppresses occurrence or worsening of an abnormality of the engine 14 or the generator 10. Accordingly, the lifetime of the engine, the generator, or the like, is extended.

Second Embodiment

Next, a second embodiment of the present invention is described. In the description of the second embodiment given below, differences from the first embodiment illustrated above are mainly described.

Figure 11A:
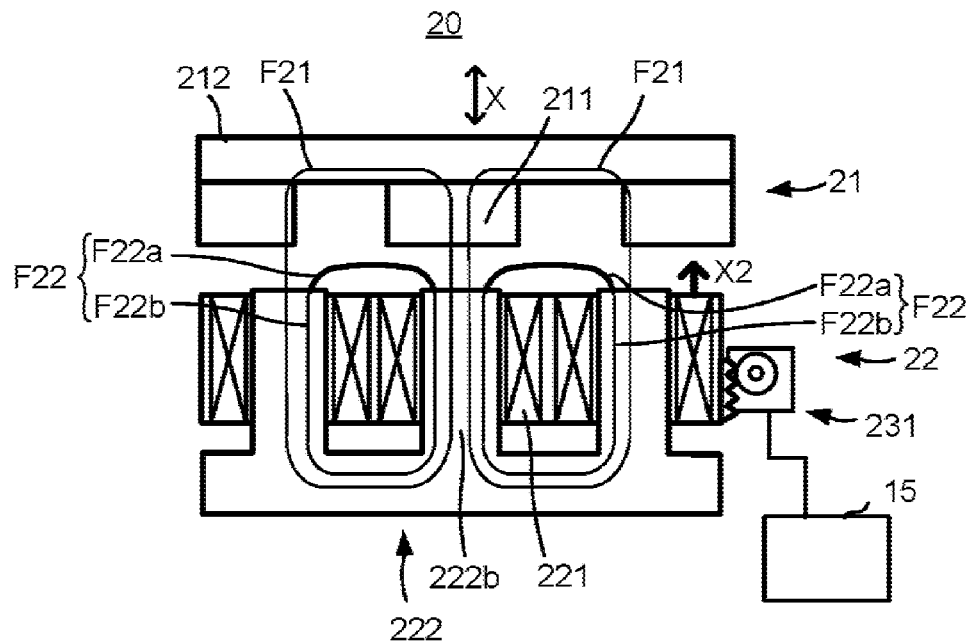
FIG. 11A is a schematic diagram for explanation of adjustment made by a supply current adjustment unit included in a generator of an engine generator unit according to a second embodiment.
Figure 11B:
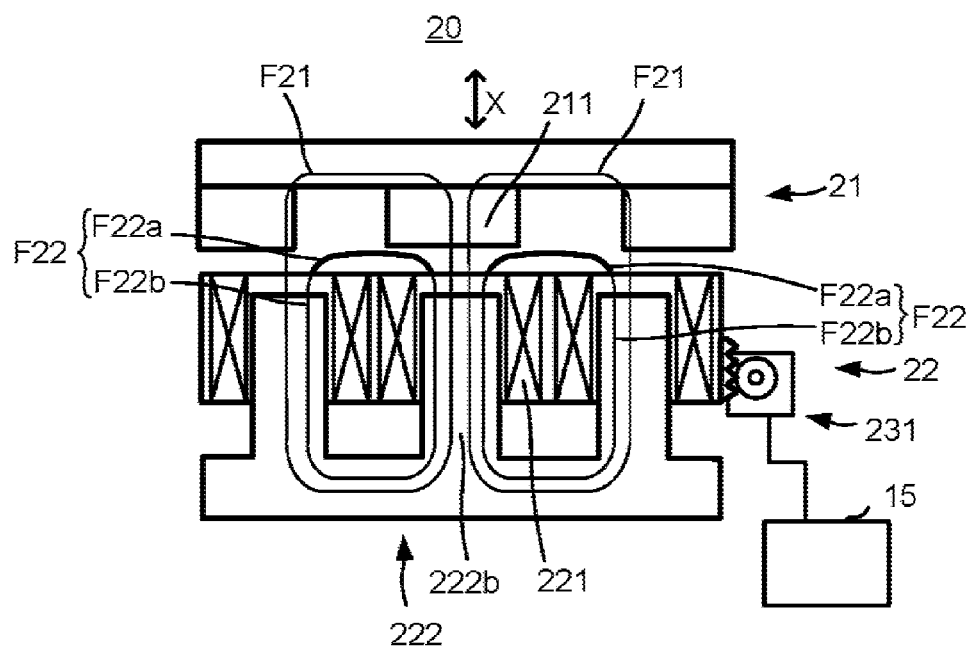
FIG. 11B is a schematic diagram showing a state in which the inductance of a winding is set lower than that of FIG. 11A.

FIG. 11A and FIG. 11B are schematic diagrams for explanation of adjustment made by a supply current adjustment unit provided in a generator 20 of an engine generator unit according to the second embodiment. FIG. 11A shows a state in which the inductance of a winding 221 is set to the highest settable value. FIG. 11B shows a state in which the inductance of the winding 221 is set to a value lower than that of FIG. 11A.

The positional relationship among windings 221, a stator core 222, and a rotor 21 shown in FIG. 11A is the same as the positional relationship thereamong in the first embodiment having been described with reference to FIG. 7A.

A magnetic circuit F21 is a magnetic circuit through which a magnetic flux generated by a magnetic pole part 211 flows. A magnetic circuit F22 is a magnetic circuit for the winding 221. The magnetic circuit F22 for the winding 221 is made up of a path passing through the inside of the winding 221 and providing the minimum magnetic resistance of the entire magnetic circuit F22. The magnetic circuit F22 passes through the stator core 222. The magnetic circuit F22 passes through two adjacent teeth 222b.

The magnetic circuit F22 passing through the stator core 222 includes an air gap F22a. The air gap F22a exists between the winding 221 and the rotor 21. The air gap F22a included in the magnetic circuit F22 exists between the winding 221 and the rotor 21 and between the two adjacent teeth 222b. The air gap F22a included in the magnetic circuit F22 is provided so as to connect respective portions of the two adjacent teeth 222b opposite to the rotor 21.

The magnetic circuit F22 for the winding 221 does not pass through a back yoke part 212 of the rotor 21. The magnetic circuit F22 for the winding 221 includes the air gap F22a between the two adjacent teeth 122b.

In the state shown in FIG. 11A, the air gap F22a included in the magnetic circuit F22 has the highest magnetic resistance among portions of the magnetic circuit F22. The air gap F22a has a higher magnetic resistance than that of a remaining portion F22b of the magnetic circuit F22 other than the air gap F22a.

In the generator 20 shown in FIG. 11A, a supply current adjustment unit 231 moves the windings 221. Thus, the supply current adjustment unit 231 changes the magnetic resistance of the magnetic circuit F22 for the winding 221. Thus, the supply current adjustment unit 231 changes the inductance of the winding 221, to adjust the current to be supplied to the motor 18 (see FIG. 2).

The supply current adjustment unit 231 moves the windings 221 without moving the stator core 222 of the stator 22.

More specifically, the stator core 222 is secured to a casing (not shown). The rotor 21 is rotatably supported on the casing. The rotor 21 is secured with respect to the axial direction X. The windings 221 are supported on the casing such that the windings 221 are freely movable in the axial direction X relative to the casing.

The supply current adjustment unit 231 moves the windings 221 in such a direction that the teeth 222b come into and out of the cylindrical shapes of the windings 221. In this embodiment, the current adjustment unit 231 moves the windings 221 in the axial direction X. The supply current adjustment unit 231 moves the windings 221 in a direction indicated by the arrow X2, for example. All the windings 221 wound on the teeth 222b provided in the generator 20 are moved integrally. The control device 15 operates the supply current adjustment unit 231 in accordance with the current request.

FIG. 11B shows a state having a lower inductance than that of the state shown in FIG. 11A. The state shown in FIG. 11B is a state after the windings 221 are moved in the direction of the arrow X2.

In this embodiment, the supply current adjustment unit 231 moves the windings 221 alone, in accordance with the current request. In this manner, the supply current adjustment unit 231 moves the position of the stator core 222 relative to the windings 221

For example, when the windings 221 are moved in the direction of the arrow X2, that is, toward the rotor 21, the teeth 222b of the stator core 222 are pulled out of the windings 221. Pulling the teeth 222b out of the windings 221 reduces the volume of the stator core 222 existing within the windings 221. As a result, the length of the air gap F22a included in the magnetic circuit F22 for the winding 221 increases. This increases the magnetic resistance of the air gap F22a between the winding 221 and the rotor 21. That is, the magnetic resistance of the air gap F22a, which has the highest magnetic resistance, is increased. As a result, the magnetic resistance of the magnetic circuit F22 for the winding 221 increases. Consequently, the inductance of the winding 221 decreases.

The supply current adjustment unit 231 changes the magnetic resistance of the air gap F22a whose magnetic resistance is highest. Thus, the supply current adjustment unit 131 changes the magnetic resistance of the magnetic circuit F22 passing through the adjacent teeth 122b. Accordingly, a larger change of the inductance of the winding 221 is likely to occur as compared with, for example, changing the magnetic resistance of the portion F22b other than the air gap F22a.

In this manner, the supply current adjustment unit 231 changes the magnetic resistance of the magnetic circuit F22 for the winding 221. Thus, the supply current adjustment unit 231 changes the inductance of the winding 221.

For example, the supply current adjustment unit 231 increases the magnetic resistance of the magnetic circuit F22 passing through the stator core 222 when viewed from the winding 221 side, in accordance with a request for increasing the current. Thus, the supply current adjustment unit 231 reduces the inductance of the winding 221. As a result, the current to be supplied to the motor 18 (see FIG. 2) serving as the electrical load device can be increased.

The supply current adjustment unit 231 changes the inductance of the winding 221 by changing the magnetic resistance of the air gap F22a existing between the winding 221 and the rotor 21. This results in a reduction of an alternating magnetic field loss. Accordingly, the current to be supplied to the motor 18 serving as the electrical load device can be adjusted to an increased degree.

Third Embodiment

Next, a third embodiment of the present invention is described. In the description of the third embodiment given below, differences from the first embodiment illustrated above are mainly described.

Figure 12:
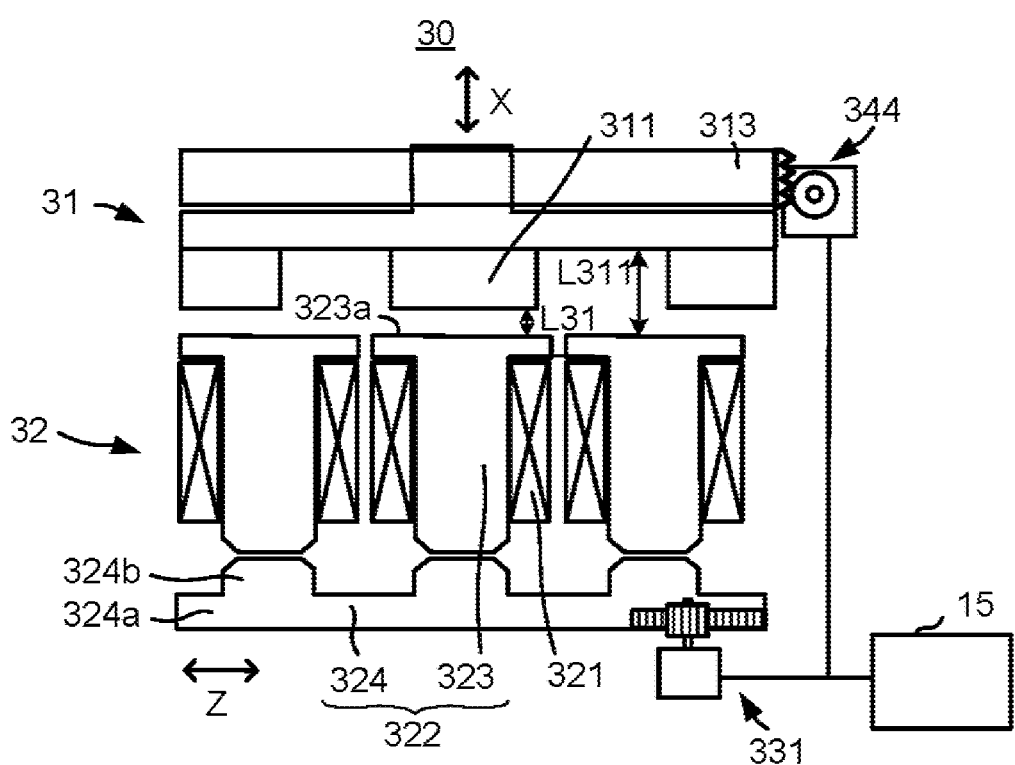
FIG. 12 is a schematic diagram showing a generator of an engine generator unit according to a third embodiment.

FIG. 12 is a schematic diagram showing a generator 30 of an engine generator unit according to the third embodiment.

A stator core 322 provided in the generator 30 shown in FIG. 12 includes a plurality of first stator core parts 323 and a second stator core part 324.

Each of the plurality of first stator core parts 323 is provided with a facing portion 323a that faces the rotor 31 with an air gap therebetween. The plurality of first stator core parts 323 are annularly arranged at intervals. That is, the plurality of first stator core parts 323 align in the circumferential direction Z. The plurality of first stator core parts 323 function as primary teeth in the stator 32. In the specification herein, the first stator core parts 323 may also be referred to as first teeth 323. The length of the facing portion 323a of the first stator core part 323 with respect to the circumferential direction Z is longer than the length of any portion of the first stator core part 323 other than the facing portion 323a with respect to the circumferential direction Z. A winding 321 is wound on each of the first stator core parts 323.

The second stator core part 324 is arranged at a position opposite to the rotor 31 across the first stator core parts 323. The first stator core parts 323 are arranged between the second stator core part 324 and the rotor 31. The second stator core part 324 is not provided with the facing portion 323a that faces the rotor 31. The second stator core part 324 includes a stator yoke portion 324a having an annular shape and a plurality of second teeth 324b. The second teeth 324b protrude from the stator yoke portion 324a toward the first stator core part 323. The number of the second teeth 324b is equal to the number of the first stator core parts 323. The stator yoke portion 324a and the second teeth 324b may be configured such that substantially all of the magnetic fluxes flowing through the second teeth 324b flow through the stator yoke portion 324a. That is, the second teeth 324b may be formed integral with the stator yoke portion 324a. Alternatively, the second teeth 324b may be formed separate from the stator yoke portion 324a such that they are attachable to the stator yoke portion 324a. The second teeth 324b are arranged so as to align in the circumferential direction Z. The plurality of second teeth 324b are annularly arranged at intervals equal to the intervals of the first stator core parts 323.

A supply current adjustment unit 331 of the generator 30 of this embodiment moves the position of a part of the stator core 322 relative to the winding 321. The supply current adjustment unit 331 moves one of the plurality of first stator core parts 323 and the second stator core part 324 relative to the other. Thus, the supply current adjustment unit 331 changes the magnetic resistance for the winding 321. This is how the supply current adjustment unit 331 adjusts the current to be supplied to the motor 18.

In more detail, the first stator core parts 323 are secured to a casing (not shown). The second stator core part 324 is supported so as to be rotatable in the circumferential direction Z. The supply current adjustment unit 331 rotates the second stator core part 324 in the circumferential direction Z about the rotation axis of the rotor 31. In this manner, the supply current adjustment unit 331 moves the second stator core part 324 from a first state (see FIG. 13A) to a second state (see FIG. 13B).

Figure 13A:
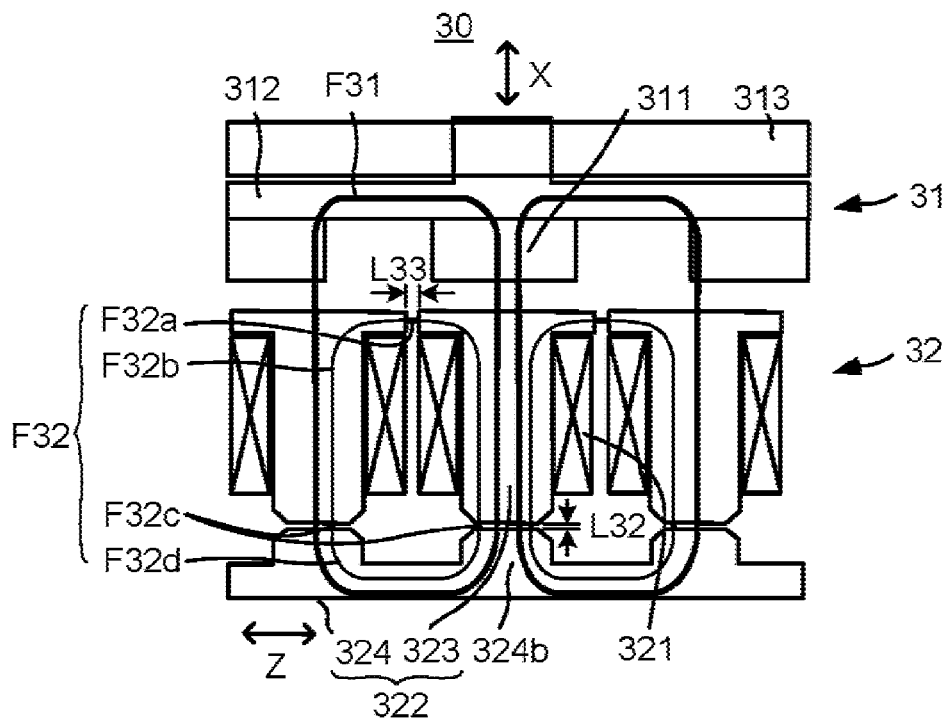
FIG. 13A is a schematic diagram showing a first state of a stator shown in FIG. 12.
Figure 13B:
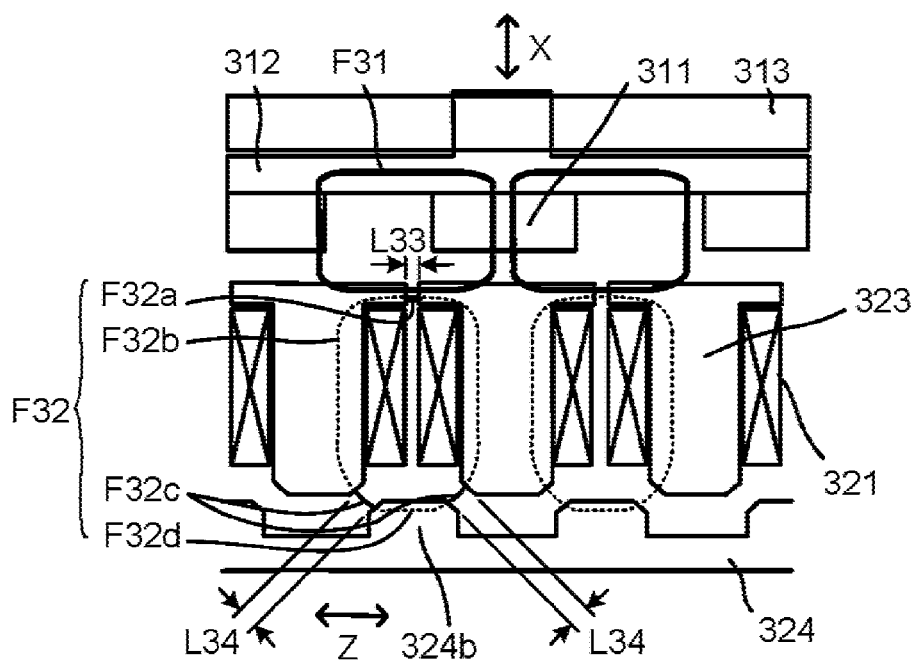
FIG. 13B is a schematic diagram showing a second state of the stator shown in FIG. 12.

FIG. 13A is a schematic diagram showing the first state of the stator 32 shown in FIG. 12. FIG. 13B is a schematic diagram showing the second state of the stator 32 shown in FIG. 12.

In the state shown in FIG. 13A, the inductance of the winding 321 is set to the highest settable value. In the state shown in FIG. 13B, the inductance of the winding 321 is set to a value lower than that of FIG. 13A.

In the first state shown in FIG. 13A, each of the plurality of second teeth 324b is positioned with respect to the circumferential direction Z so as to confront each of the plurality of first stator core parts 323. In the first state, an air gap length L32 between each of the plurality of first stator core parts 323 and the second stator core part 324 is shorter than an air gap length L33 between adjacent ones of the plurality of first stator core parts 323. To be exact, the air gap length L33 is the length of an air gap formed between respective portions of the first stator core parts 323, each of the portions arranged between the winding 321 and the rotor 31 with respect to a direction in which the rotor 31 and the stator 32 are opposite to each other.

In the second state shown in FIG. 13B, each of the plurality of second teeth 324b is positioned between adjacent ones of the first stator core parts 323 with respect to the circumferential direction Z. In the second state, an air gap length L34 between each of the plurality of first stator core parts 323 and the second stator core part 324 is longer than the air gap length L33 between adjacent ones of the plurality of first stator core parts 323.

Adjustment made by the supply current adjustment unit 331 of the generator 30 according to the third embodiment is described.

FIG. 13A and FIG. 13B illustrate a magnetic circuit F31 through which a magnetic flux generated by a magnetic pole part 311 flows, and a magnetic circuit F32 for the winding 321. The magnetic circuit F32 for the winding 321 is made up of a path passing through the inside of the winding 321 and providing the minimum magnetic resistance of the entire magnetic circuit F32. The magnetic circuit F32 passes through the stator core 322. The magnetic circuit F32 passes through two adjacent first stator core parts 323 (first teeth 323).

The magnetic circuit F32 includes three air gaps. A portion of the magnetic circuit F32 corresponding to an air gap between the two adjacent first stator core parts 323 (first teeth 323) is referred to as an air gap F32a. Portions of the magnetic circuit F32 corresponding to air gaps each between each of the two adjacent first stator core parts 323 (first teeth 323) and the second stator core part 324 is referred to as air gaps F32c. The air gap F32a between the two adjacent first stator core parts 323 (first teeth 323) exists between the winding 321 and the rotor 31. The air gap F32a included in the magnetic circuit F32 exists between the winding 321 and the rotor 31 and between the two adjacent first stator core parts 323 (first teeth 323). The air gap F32a is provided so as to connect mutually opposite end surfaces of the respective two adjacent first stator core parts 323 (first teeth 323).

In the first state shown in FIG. 13A, the air gap length L32 between each of the plurality of first stator core parts 323 (first teeth 323) and the second stator core part 324 is shorter than the air gap length L33 between adjacent ones of the plurality of first stator core parts 323 (first teeth 323). The air gap length L33 is the largest air gap length in the magnetic circuit F32. In the first state, therefore, the air gap F32a between the adjacent first stator core parts 323 has the highest magnetic resistance among portions of the magnetic circuit F32 for the winding 321. The magnetic resistance of the air gap F32a is higher than the magnetic resistance of any of remaining portions F32b, F32c, and F32d of the magnetic circuit F32 other than the air gap F32a. The magnetic resistance of the air gap F32a is higher than the magnetic resistance of the air gap F32c between the first stator core part 323 and the second stator core part 324.

A magnetic flux F32 generated by the current in the winding 321 flows through the adjacent first stator core parts 323 and the second stator core part 324, as shown in FIG. 13A. The magnetic resistance of the magnetic circuit F32 for the winding 321, which passes through the stator core 322, depends on the air gap length L33 between the adjacent first stator core parts 323. The air gap length L33 is the largest air gap length in the magnetic circuit F32.

The magnetic flux F31 generated by the magnetic pole part 311 flows through the two adjacent first stator core parts 323. The magnetic flux F31 flows through one magnetic pole part 311, a gap between the magnetic pole part 311 and the first stator core part 323, the first stator core part 323, the second stator core part 324, an adjacent first stator core part 323, a gap between the first stator core part 323 and the magnetic pole part 311, an adjacent magnetic pole part 311, and the back yoke part 312. In the first state shown in FIG. 13A, the magnetic flux F31 of the magnetic pole part 311 passes through the two adjacent first stator core parts 323 and the second stator core part 324.

In the second state shown in FIG. 13B, an air gap length L34 between each of the plurality of first stator core parts 323 and the second stator core part 324 is longer than the air gap length L33 between adjacent ones of the plurality of first stator core parts 323. Therefore, the magnetic resistance of the magnetic circuit F32 for the winding 321, which passes through the stator core 322, is strongly influenced by the air gap length L34 between the first stator core part 323 and the second stator core part 324. As a result, in the second state, the magnetic resistance of the magnetic circuit F32 for the winding 321 is higher than the magnetic resistance in the first state.

The magnetic flux F31 generated by the magnetic pole part 311 flows through one magnetic pole part 311, the gap between the magnetic pole part 311 and the first stator core part 323, and the first stator core part 323. The magnetic flux F31 flows from the first stator core part 323 directly to the adjacent first stator core part 323. The magnetic flux F31 generated by the magnetic pole part 311 flows through a gap between the two adjacent first stator core parts 323. In the second state, the path of the magnetic flux F31 generated by the magnetic pole part 311 is switched in the above-described manner. In the second state, even if the path of the magnetic flux F31 is not switched, at least a portion of the magnetic flux F31 generated by the magnetic pole part 311 is increased, the portion flowing through the gap between the two adjacent first stator core parts 323. The increase of the portion of the magnetic flux F31 flowing through the gap between the two adjacent first stator core parts 323 leads to a substantial increase of the magnetic resistance of the air gap F32a. This is, in a magnetical sense, equivalent to an increase of the air gap length L33 between the two adjacent first stator core parts 323. Thus, the magnetic resistance of the magnetic circuit F32 including the air gap F32a is further increased. The change rate of the inductance of the winding 321 is higher than the change rate of the magnetic flux that is generated by the magnetic pole part 311 and linked with the winding 321.

As described above, the inductance of the winding 321 is liable to be in reverse proportion to the magnetic resistance for the winding 321. Therefore, the inductance of the winding 321 in the second state is lower than the inductance of the winding 321 in the first state.

The supply current adjustment unit 331 moves one of the plurality of first stator core parts 323 and the second stator core part 324 relative to the other so as to shift from the first state (see FIG. 13A) to the second state (see FIG. 13B). In this manner, the supply current adjustment unit 331 changes the magnetic resistance of the magnetic circuit F32 for the winding 321. Thus, the supply current adjustment unit 331 changes the inductance of the winding 321. This is how to adjust the current to be supplied to the motor 18 (see FIG. 2).

The supply current adjustment unit 331 changes the magnetic resistance of the air gap F32a. The supply current adjustment unit 331 changes the magnetic resistance of the air gap F32a without changing the air gap length L33 between the first stator core parts 323 serving as the adjacent teeth. Thus, the supply current adjustment unit 331 changes the magnetic resistance of the magnetic circuit F32 passing through the first stator core parts 323 serving as the adjacent teeth. In the first state, the air gap F32a has the highest magnetic resistance among portions of the magnetic circuit F32. Therefore, a change of the inductance of the winding 321 can be greater than that obtained when, for example, changing the magnetic resistance of portions other than the air gap F32a.

The supply current adjustment unit 331 changes the inductance of the winding 321 by changing the magnetic resistance of the air gap F32a existing between the winding 321 and the rotor 31. This results in a reduction of an alternating magnetic field loss. Accordingly, the current to be supplied to the motor 18 serving as the electrical load device can be adjusted to an increased degree.

[Current Characteristics]

Figure 14:
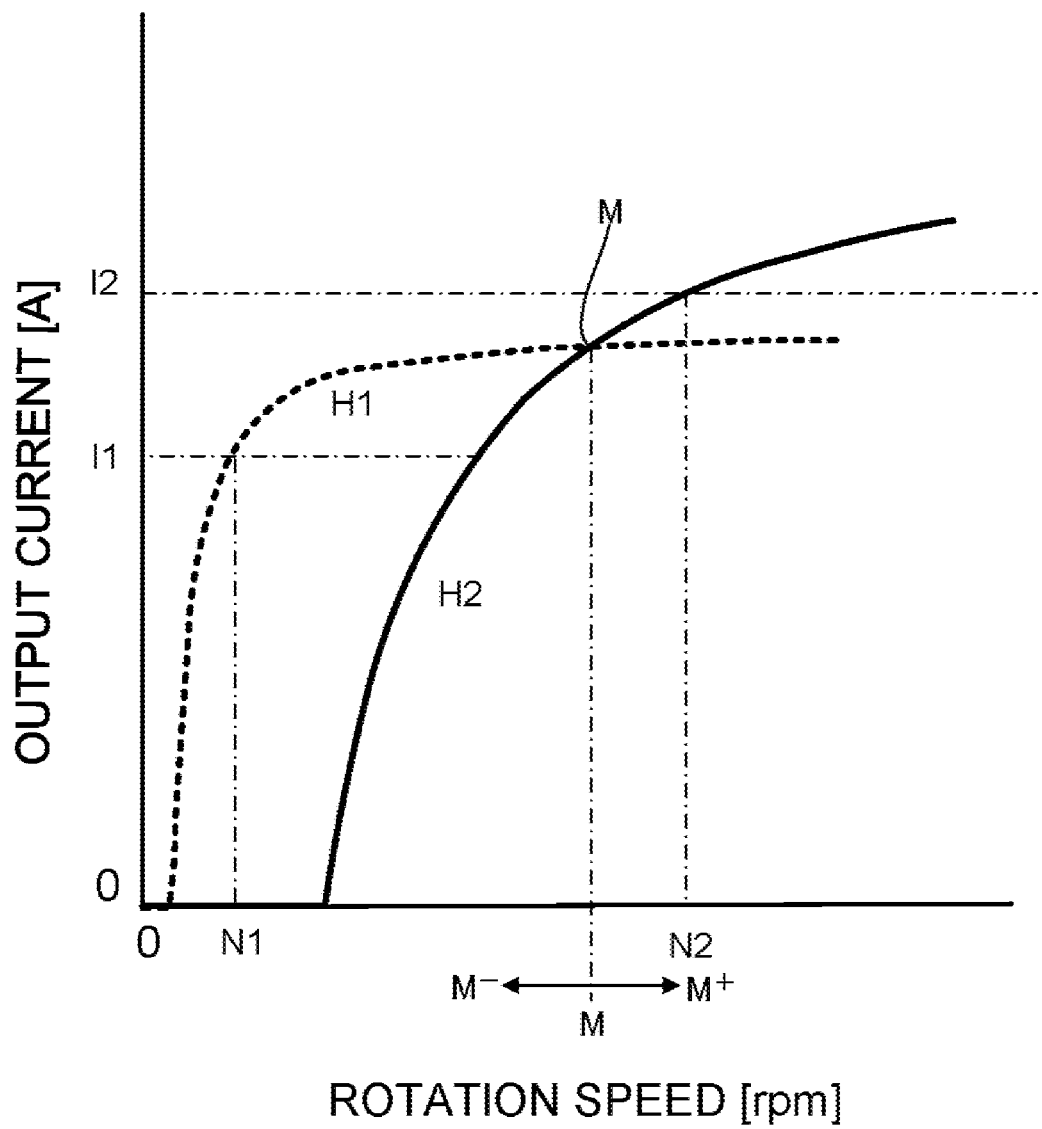
FIG. 14 is a graph showing output current characteristics relative to the rotation speed of a rotor included in the generator shown in FIG. 12.

FIG. 14 is a graph showing output current characteristics relative to the rotation speed of the rotor 31 of the generator 30 shown in FIG. 12.

In the graph of FIG. 14, the broken line H1 represents the output current characteristics in the first state shown in FIG. 13A. In a case of the generator 30 having the output current characteristics represented by the broken line H1, the generator 30 operates in such a manner that the combination of the output current and the rotation speed locates in a region on or below the broken line H1 in the graph of FIG. 14. The solid line H2 represents the output current characteristics in the second state shown in FIG. 13B. In a case of the generator 30 having the output current characteristics represented by the solid line H2, the generator 30 operates in such a manner that the combination of the output current and the rotation speed locates in a region on or below the solid line H2. Here, for describing a current control in an easy-to-understand manner, the graph of FIG. 14 shows the characteristics obtained when a supply voltage adjustment unit 344 (see FIG. 12) is not operated.

The adjustment made in the generator 30 is described with reference to the graph of FIG. 14.

Focusing on the output current obtained in the first state represented by the broken line H1, the output current increases as the rotation speed increases. The rotation speed of the rotor 31 is, therefore, also usable to adjust the output current of the engine generator unit. The rotation speed of the rotor 31 corresponds to the rotation speed of the output shaft C (see FIG. 2) of the engine 14.

In the first state, the increase of the output current in accordance with the increase of the rotation speed is steep in a region where the rotation speed of the rotor 31 is relatively low. In the first state, the increase of the output current in accordance with the increase of the rotation speed is gentle in a region where the rotation speed is relatively high. That is, the change rate of the output current relative to the change of the rotation speed is low in the region where the rotation speed is relatively high.

For example, if the generator 30 is fixed in the first state, a significant increase of the rotation speed of the rotor 31 is required in order to increase the output current in a region where the change rate of the output current relative to the change of the rotation speed is low.

For example, the vehicle V (see FIG. 2) traveling at a high speed requires a further increase of the output torque of the motor 18 when the vehicle starts uphill traveling or overtakes another vehicle during traveling. A request for an increased current is issued in such a situation.

If the request for an increased current for achieving further acceleration is issued while the state of the supply current adjustment unit 331 is fixed, a further increase of the rotation speed of the rotor 31, which means the rotation speed of the engine 14, is required. That is, an excessive increase of the rotational power of the engine 14 is required in order to increase the output current.

For example, a situation is assumed in which, when the rotation speed is N1 and the output current is I1, a request for an increased current is issued so that the current needs to be increased to I2. In this situation, if the generator 30 is fixed in the first state which corresponds to H1 in the graph, an excessive increase of the rotation speed of the rotor 31 occurs. In other words, an excessive increase of the rotation speed of the engine 14 occurs. This decreases the fuel efficiency of the engine 14 itself.

The induced voltage of the winding 321 is substantially in proportion to the rotation speed of the rotor 31. A significant increase of the rotation speed causes a significant increase of the induced voltage. To withstand the significant increase of the voltage, electrical components need to have a high breakdown voltage. This leads to a decrease in efficiency due to an increased breakdown voltage of the electrical components.

In the current control, the control device 15 controls the supply current adjustment unit 331 (see FIG. 12) in addition to the engine output adjustment unit 141 (see FIG. 2). In this manner, the control device 15 changes the magnetic resistance of the magnetic circuit F32 for the winding 321 in accordance with the current request. Thus, the control device 15 changes the inductance of the winding 321. This is how to adjust the current to be supplied to the motor 18. To be more specific, the supply current adjustment unit 331 moves the second stator core part 324 from the first state (see FIG. 13A) to the second state (see FIG. 13B). As a result, the output current characteristics change from the one represented by the broken line H1 to the one represented by the solid line H2 in FIG. 14.

The control device 15 reduces the inductance while increasing the rotation speed of the engine 14 to N2. This increases the output current to I2.

In the current control, the control device 15 controls the adjustment made by the engine output adjustment unit 141 and the adjustment made by the supply current adjustment unit 331 in an integrated manner. The control device 15 controls the engine output adjustment unit 141 and the supply current adjustment unit 331 as follows. The supply current adjustment unit 331 starts a process of reducing the inductance of the winding 321 before the engine output adjustment unit 141 terminates a process of increasing the rotational power of the engine 14. That is, there is an overlap between a period in which the supply current adjustment unit 331 is reducing the inductance of the winding 321 and a period in which the engine output adjustment unit 141 is increasing the rotational power of the engine 14.

This provides smooth increase of the current supplied from the engine generator unit P to the motor 18 under control of the control device 15. In addition, occurrence of a situation can be suppressed in which the rotational power of the engine 14 excessively increases before the output current of the generator 30 reaches a requested current value in the process of adjusting the rotational power.

A voltage control performed by the control device 15 is described. Upon a request for increasing the voltage, the control device 15 does not reduce the inductance L. The control device 15 directs the engine output adjustment unit 141 (see FIG. 2) to increase the rotational power of the engine 14 without directing the supply current adjustment unit 331 to reduce the inductance L of the winding 321.

In this embodiment, the control device 15 directs the engine output adjustment unit 141 to increase the rotational power of the engine 14, while maintaining the supply current adjustment unit 331 (see FIG. 12) in the first state (see FIG. 13A) which corresponds to the broken line H1 in the graph of FIG. 14.

The induced voltage E (see FIG. 8) generated in the generator 30 is substantially in proportion to the rotation speed co. In particular, a situation requesting an increase of the voltage generally occurs when impedance Zm of the motor 18 itself is high. In such a state, the impedance Zg of the winding 321 is less influential to the output voltage of the engine generator unit P Therefore, a voltage according to the induced voltage E is outputted from the engine generator unit P.

The engine generator unit P is able to respond to a request for increasing the voltage, without directing the supply current adjustment unit 331 to reduce the inductance L of the winding 321.

In order that, instead of the engine generator unit P of this embodiment, a commonly-used generator that is unable to change the inductance can provide output current characteristics as represented by the solid line H2 of FIG. 14, it is necessary to increase the thickness of the winding or the amount of magnets. Increasing the thickness of the winding or the amount of magnets leads to a size increase of the engine generator unit itself. As a result, the mountability to vehicle and the portability of the engine generator unit P are deteriorated. If a commonly-used generator that is unable to change the inductance is configured so as to provide output current characteristics as represented by the solid line H2, such generator cannot provide output current characteristics as represented by the broken line H1.

As a method for adjusting the current to be supplied to the motor 18, for example, use of a DC-DC converter is conceivable. A DC-DC converter configured to input and output electric power capable of driving the vehicle V however, cannot avoid a size increase of its component such as a built-in transformer in response to an increase of required electric power.

In the engine generator unit of this embodiment, the control device 15 controls the supply current adjustment unit 331 so as to change the magnetic resistance of the magnetic circuit F32 for the winding 321 in accordance with the current request. Thus, the control device 15 changes the inductance of the winding 321. This enables the control device 15 to adjust the current in accordance with the current request without increasing the thickness of the winding or the amount of magnets.

Referring to FIG. 12 again, the supply voltage adjustment unit 344 of the generator 30 is described.

The generator 30 includes the supply voltage adjustment unit 344 in addition to the supply current adjustment unit 331. The supply voltage adjustment unit 344 is under control of the control device 15.

The supply voltage adjustment unit 344 changes a linkage flux flowing from the magnetic pole part 311 of the rotor 31 and linked with the winding 321. In this manner, the supply voltage adjustment unit 344 changes the induced voltage of the winding 321. This is how the supply voltage adjustment unit 344 adjusts the voltage to be supplied to the motor 18. To be specific, the supply voltage adjustment unit 344 moves the rotor 31 in the axial direction X. Thus, the supply voltage adjustment unit 344 changes an air gap length L31 between the rotor 31 and the stator 32. Such a movement of the rotor 31 in the axial direction X is implemented by, for example, the supply voltage adjustment unit 344 configured to move a bearing part 313 in the axial direction X, the bearing part 313 supporting the rotor 31 in a rotatable manner. The change of the air gap length L31 between the rotor 31 and the stator 32 leads to a change of the magnetic resistance between the rotor 31 and the stator 32. As a result, the amount of the magnetic flux generated by the magnetic pole part 311 and linked with the winding 321 is changed. The voltage generated by the generator 30 is changed accordingly.

As thus far described, the engine generator unit of this embodiment is able to adjust the voltage to be supplied to the motor 18 in a way other than by the engine output adjustment unit 141 adjusting the rotational power of the engine 14. This provides an increased degree of freedom in terms of controlling, with suppression of a decrease in fuel efficiency.

The supply voltage adjustment unit 344 achieves more reduction of a variation in the linkage flux linked with the winding 321, the variation caused by the operation of the supply current adjustment unit 331, the more reduction achieved in the following manner.

The linkage flux flowing from the magnetic pole part 311 of the rotor 31 and linked with the winding 321 flows through the stator core 322. Specifically, the linkage flux flowing from the magnetic pole part 311 and linked with the winding 321 flows through the first stator core part 323 and the second stator core part 324.

In response to the supply current adjustment unit 331 moving the second stator core part 324 so as to shift from the first state (see FIG. 13A) to the second state (see FIG. 13B), the air gap length L32, L34 between the first stator core part 323 and the second stator core part 324 is changed. As a result, the amount of the linkage flux flowing from the magnetic pole part 311 of the rotor 31 and linked with the winding 321 is changed.

The supply voltage adjustment unit 344 changes the air gap length L31 between the rotor 31 and the stator 32 so as to compensate for a variation in the linkage flux linked with the winding 321, the variation caused by the operation of the supply current adjustment unit 331. This can reduce the variation in the linkage flux linked with the winding 321, the variation caused by the operation of the supply current adjustment unit 331.

The supply current adjustment unit 331, in combination with the compensation made by the supply voltage adjustment unit 344, is able to adjust the current while less influenced by voltage constraints.

In the third embodiment described above, the generator 30 includes both the supply current adjustment unit 331 and the supply voltage adjustment unit 344. The supply voltage adjustment unit, however, is not indispensable in the engine generator unit of the present invention.

In the third embodiment described above with reference to the current characteristics graph of FIG. 14, the current to be supplied to the motor 18 can be adjusted while controlling the inductance. Here, it is to be noted that in the first embodiment and the second embodiment as well, the current to be supplied to the motor 18 can be adjusted while controlling the inductance.

The first stator core part 323, which is illustrated as an example of the first stator core part in the third embodiment above, has, in its end portion opposite to the rotor, protruding portions protruding in the circumferential direction Z which means the direction in which the first stator core parts are arranged side by side. It is however not always necessary that the first stator core part of the present invention includes the protruding portions.

In the embodiments described above, two informing devices G1, G2 are illustrated. The number of informing devices may be one, or may be three or more.

In the embodiments, a mobile terminal that indicates store information is illustrated as an example of the informing device. The informing device that indicates store information is not limited to the mobile terminal. The informing device may be, for example, attached to the vehicle. The informing device may be, for example, a navigation device attached to the vehicle.

The store visit promotion operation performed by the informing device is outputting of information that prompts the user to go to a store where the unit is replaceable. The store visit promotion operation performed by the informing device may not necessarily be outputting of information that directly expresses vehicle maintenance. The store visit promotion operation performed by the informing device may be outputting of information that indirectly expresses a store visit to the store. For example, the store visit promotion operation performed by the informing device may be providing of information that prompts a visit for enjoying food and drink served by the store. The informing device may provide information that prompts a visit for seeing products exhibited in the store.

The vehicle of the present invention has a high fuel efficiency and a low emission as compared with, for example, an electric car or a vehicle of the type in which a driving force of an engine is transmitted to a wheel. The informing device may output information about a high fuel efficiency and a low emission. For example, the informing device may be configured to display information showing the degree of contribution to natural environment protection according to the history information. For example, the informing device may be configured to display information that prompts a store visit on condition that the degree of contribution to protection reaches a predetermined reference value.

The embodiments illustrate that the control device 15 uses the information (A) to (O) mentioned above to determine whether there is any functional abnormality of components included in the engine 14. This, however, is not limiting the control device of the present invention, and information other than (A) to (O) may be used.

In addition, it may be possible that the control device of the present invention detects a functional abnormality of a component other than the engine. For example, the control device may output the store visit promotion signal if there is a functional abnormality of the control device itself or the storage device included in the control device.

The embodiments illustrate that the control device 15 outputs the store visit promotion signal when the amount of liquid fuel in the fuel tank is less than the reference value. It may be also acceptable that the control device outputs the store visit promotion signal if, for example, the amount of oil or the amount of cooling water in addition to the amount of liquid fuel is less than a reference value.

The embodiments illustrate that the control device uses the information (A) to (O) mentioned above to determine a functional abnormality of components of the engine. An object to be determined in relation to a functional abnormality of the components is not limited to (A) to (O). The control device may use information other than (A) to (O) to determine a functional abnormality of the components of the engine.

In a possible example, the control device may output the store visit promotion signal at predetermined time and date. The time and date for outputting the store visit promotion signal are adjusted such that the frequency of output of the store visit promotion signal increases. In this case, a timing when the store visit promotion signal is outputted is included in a period during which the engine causes the generator to generate electric power.

Examples of the vehicle of the present invention may include motorcycles, motor tricycles, buses, trucks, golf carts, carts, ATVs (All-Terrain Vehicles), ROVs (Recreational Off-highway Vehicles), and track-type vehicles.

The vehicle may be provided with a drive mechanism different from the wheel. Examples of the vehicle include industrial vehicles typified by forklifts, agricultural vehicles, military vehicles, snowmobiles, construction machines, small planing boats (water vehicles), marine crafts, outboard engines, inboard engines, airplanes, and helicopters.

In the embodiments, the rotor and the stator having an axial gap structure are illustrated as an example of the structure of each of the generator and the motor. It may also be possible that the generator and/or the motor has a radial gap structure in which a rotor and a stator are opposite to each other with an air gap therebetween with respect to a radial direction. The axial direction X (see FIG. 2) defined in the axial gap structure of these embodiments is one example of the direction in which the rotor and the stator of the present invention are opposite to each other. In the radial gap structure, the rotor and the stator are opposite to each other with respect to the radial direction.

In the embodiments described above, the generator including an SPM generator is illustrated as an example. Alternatively, the generator of the present invention may be an IPM (Interior Permanent Magnet) generator.

The air gap illustrated in the embodiments described above is one example of the non-magnetic gap. The non-magnetic gap is a gap made of a single type of a non-magnetic material or a plurality of types of non-magnetic materials. No particular limitation is put on the non-magnetic material. Examples of the non-magnetic material include air, aluminum, and resins. It is preferable that the non-magnetic gap includes at least an air gap.

The motor of the present invention may be, for example, an in-wheel motor arranged in the drive wheel. The motor may be a motor having the same structure as that of the generator illustrated in the embodiments. For example, the motor may be structured so as to include the plurality of first stator core parts and the second stator core part and configured to move one of the first stator core parts and the second stator core part relative to the other.

The vehicle of the present invention may be provided with a battery. The engine generator unit may be provided with a battery that supplies electric power to the generator for starting the engine, for example. Here, the battery does not output electric power to the electromotive driving unit.

The vehicle of the present invention may be provided with a battery that stores electric power supplied from the engine generator unit. In addition, the motor of the vehicle may be driven by electric power stored in the battery, for example.

Moreover, the motor of the vehicle may be operated by electric power that is supplied concurrently from both the engine generator unit and the battery, for example.

The power generation control unit and the electric power output unit of the present invention may be integrated. The power generation control unit and the electric power output unit may be physically separate devices.

In the embodiments described above, the unit P including the fuel tank 10A, the air cleaner 10B, and the muffler 10D is illustrated as an example of the engine generator unit. This, however, is not limiting the engine generator unit of the present invention. For example, it may be acceptable that a fuel tank, an air cleaner, and a muffler are provided not in the engine generator unit but in the vehicle body of the vehicle V. That is, it suffices that the engine of the present invention includes at least a cylinder, a piston, and an output shaft, which are necessary for fuel combustion to output rotational power. The engine of the present invention does not include a fuel tank, an air cleaner, and a muffler.

In the embodiments described above, the accelerator operator is illustrated as an example of the request indication unit A. Here, the torque request issued to the drive system of the present invention may not always need to be an output of the request indication unit. The following are some examples of the torque request issued to the drive system:

a signal of requesting acceleration issued by an automatic speed control device (cruise control) of the vehicle;

an output of a switch and volume different from the accelerator operator, which is operated by the driver; or an output of an operator provided in an electrical load device.

In the embodiments described above, the control device 15 constituted of a microcontroller is illustrated as an example of the control device. This, however, is not limiting the present invention. The control device may be constituted of a wired logic, for example.

In the embodiments described above, the generator including the supply current adjustment unit is illustrated as an example of the generator. The generator of the present invention may not necessarily include the supply current adjustment unit. Providing the supply current adjustment unit in the generator, however, improves the fuel efficiency.

The present invention is not limited to the examples illustrated above, and for example, the following configurations can be adoptable. The following configurations are embodied by the above-described embodiments.

In a seventh aspect, in the vehicle of any one of the above-described first to fifth aspects, the generator includes a rotor, a stator, and a supply current adjustment unit, the rotor including a permanent magnet, the rotor connected to the engine, the stator arranged opposite to the rotor, and the stator including a winding and a stator core with the winding wound thereon. The supply current adjustment unit is configured to adjust a current to be supplied to an electrical load device, the adjustment implemented by changing an inductance of the winding, the change implemented by changing a magnetic resistance of a magnetic circuit for the winding, which passes through the stator core.

The control device is configured to, upon a request for increasing a current to be supplied to the electromotive driving unit, direct the supply current adjustment unit to change the inductance of the winding, to adjust a current to be outputted from the generator.

The control device controls the current to be outputted from the generator, in response to a request for increasing the current to be supplied to the electromotive driving unit.

It has been conventionally believed that an increase of a current outputted from a generator is caused mainly by an increase of a voltage. A voltage is increased by, for example, an increase of the rotation speed, an increase of a magnetic force, or an increase of the number of turns of a winding. A current reaches saturation as the rotation speed increases due to an armature reaction. The increase of the magnetic force or the increase of the number of turns of the winding leads to a size increase.

One conceivable way to increase the current outputted from the generator is reducing the armature reaction which is caused by an inductance. It however has been considered that reducing the inductance of a winding leads to reducing a linkage flux, which makes it difficult to increase the current.

The present inventor focused on a magnetic circuit. A magnetic circuit that influences the inductance is a magnetic circuit for a winding. The magnetic circuit for a winding is different from a magnetic circuit that extends from a magnet of a rotor and passes through a winding. The studies conducted by the present inventor were based on clear distinction between the magnetic circuit for a winding and the magnetic circuit that extends from a magnet of a rotor and passes through a winding. The present inventor consequently discovered that a large change of the inductance can be implemented by changing the magnetic resistance of the magnetic circuit for a winding.

As a consequence, the present inventor obtained the following findings in relation to a current supply system configured to receive a rotational driving force from an engine and supply a current to an electrical load device that requires a current that can be variable in accordance with a torque request. It is possible to reduce interaction between the current and voltage by adjusting the current to be supplied to the electrical load device, the adjustment implemented by changing the inductance of the winding, the change implemented by changing the magnetic resistance of the magnetic circuit for the winding, which passes through a stator core, in accordance with a current requirement of the current supply system.

In the vehicle of the seventh aspect, the supply current adjustment unit changes the magnetic resistance of the magnetic circuit for the winding, which passes through the stator core, in accordance with the current requirement of the generator. Thus, the supply current adjustment unit changes the inductance of the winding, to adjust the current to be supplied to the electrical load device. The ratio of a current change to a voltage change obtained when changing the magnetic resistance of the magnetic circuit for the winding, which passes through the stator core, is higher than that obtained when, for example, changing the rotation speed of the engine. Accordingly, the current supply system of the seventh aspect is able to adjust the current to be supplied to the electrical load device with less interaction between the voltage change and the current change as compared with when, for example, only the rotation speed of the engine is changed.

In the vehicle of the seventh aspect, therefore, the torque to be outputted to the rotational drive mechanism can be increased with suppression of an excessive increase of the rotational power of the engine and an excessive increase of the voltage. Thus, a loss that may be caused by an excessive increase of the rotational power and an excessive increase of the voltage can be suppressed. Accordingly, the configuration of the seventh aspect is able to respond to a request for increasing the torque with suppression of a decrease in fuel efficiency, in a vehicle that is as convenient as an engine vehicle from the user's standpoint and able to shorten a maintenance time for maintenance of the vehicle from the user's standpoint.

In an eighth aspect, in the vehicle of the seventh aspect, the magnetic circuit for the winding, which passes through the stator core, includes at least one non-magnetic gap, and the supply current adjustment unit adjusts the current to be supplied to the electrical load device, the adjustment implemented by changing the inductance of the winding, the change implemented by changing a magnetic resistance of a non-magnetic gap being among the at least one non-magnetic gap, the non-magnetic gap existing between the winding and the rotor.

In a ninth aspect, in the vehicle of the seventh or eighth aspects, the magnetic circuit for the winding, which passes through the stator core, includes at least one non-magnetic gap, and the supply current adjustment unit adjusts the current to be supplied to the electrical load device, the adjustment implemented by changing the inductance of the winding, the change implemented by changing a magnetic resistance of a non-magnetic gap being among the at least one non-magnetic gap, the magnetic resistance of the non-magnetic gap being highest when the inductance of the winding is set to the highest settable value.

In a tenth aspect, in the vehicle of any one of the seventh to ninth aspects, the supply current adjustment unit adjusts the supply current by changing the inductance of the winding such that the change rate of a magnetic flux linked with the winding is lower than the change rate of the inductance of the winding, the change implemented by changing the magnetic resistance of the magnetic circuit for the winding, which passes through the stator core, in accordance with a control performed by the control device.

In an eleventh aspect, in the vehicle of any one of the seventh to tenth aspects, the supply current adjustment unit adjusts the current to be supplied to the electrical load device, the adjustment implemented by changing the inductance of the winding, the change implemented by changing the magnetic resistance of the magnetic circuit for the winding, which passes through the stator core, the change of the magnetic resistance implemented by moving the position of at least a portion of the stator core relative to the winding in accordance with a control performed by the control device.

In a twelfth aspect, in the vehicle of the eleventh aspect, the supply current adjustment unit adjusts the current to be supplied to the electrical load device, the adjustment implemented by changing the inductance of the winding, the change implemented by changing the magnetic resistance of the magnetic circuit for the winding, which passes through the stator core, the change of the magnetic resistance implemented by moving the position of the stator core relative to the winding while maintaining the position of the stator core relative to the rotor in accordance with a control performed by the control device.

In a thirteenth aspect, in the vehicle of the eleventh aspect, the supply current adjustment unit adjusts the current to be supplied to the electrical load device, the adjustment implemented by changing the inductance of the winding, the change implemented by changing the magnetic resistance of the magnetic circuit for the winding, which passes through the stator core, the change of the magnetic resistance implemented by moving the winding in accordance with a control performed by the control device.

In a fourteenth aspect, in the vehicle of any one of the seventh to the eleventh aspects, the stator core includes a plurality of first stator core parts and a second stator core part, each of the plurality of first stator core parts having a facing portion that faces the rotor with a non-magnetic gap therebetween, the second stator core part not having the facing portion, and the supply current adjustment unit changes the magnetic resistance of the magnetic circuit for the winding, which passes through the stator core, the change implemented by moving one of the plurality of first stator core parts and the second stator core part relative to the other in accordance with a current requirement of the engine generator unit.

In a fifteenth aspect, in the vehicle of the fourteenth aspect, the supply current adjustment unit changes the magnetic resistance of the magnetic circuit for the winding, which passes through the stator core, the change implemented by moving one of the plurality of first stator core parts and the second stator core part relative to the other so as to shift from a first state to a second state, the first state being a state in which the length of a non-magnetic gap between each of the plurality of first stator core parts and the second stator core part is shorter than the length of a non-magnetic gap between adjacent ones of the plurality of first stator core parts, the second state being a state in which the length of the non-magnetic gap between each of the plurality of first stator core parts and the second stator core part is longer than the length of the non-magnetic gap between adjacent ones of the plurality of first stator core parts.

It should be understood that the terms and expressions used in the embodiments above are for descriptions and have no intention to be construed in a limited manner, do not eliminate any equivalents of features shown and mentioned herein, and allow various modifications falling within the claimed scope of the present invention. The present invention may be embodied in many different forms. The present disclosure is to be considered as providing examples of the principles of the invention. A number of illustrative embodiments are described herein with the understanding that such examples are not intended to limit the invention to preferred embodiments described herein and/or illustrated herein. The embodiments described herein are not limiting. The present invention includes any and all embodiments having equivalent elements, modifications, omissions, combinations, adaptations and/or alterations as would be appreciated by those in the art based on the present disclosure. The limitations in the claims are to be interpreted broadly based on the language employed in the claims and not limited to examples described in the present specification or during the prosecution of the application. The present invention should be interpreted broadly based on the language employed in the claims.

REFERENCE SIGNS LIST

V vehicle
D vehicle body
P engine generator unit
10, 20, 30 generator
11, 21, 31 rotor
12, 22, 32 stator
14 engine
15 control device
16 electric power output unit
19 electromotive driving unit
131, 231, 331 supply current adjustment unit
152 power generation control unit
153 store visit promotion signal output unit
154 detection unit
G1, G2 informing device
S store

What is claimed is:
1. A vehicle comprising:
a vehicle body;
an electromotive driving unit mounted on the vehicle body, the electromotive driving unit driven electrically;
an engine operable with a liquid fuel;
a generator that generates electric power, the generator driven by the engine; and
a control device including a power generation control unit and an electric power output unit, the power generation control unit outputting a signal for controlling the engine and the generator, the electric power output unit outputting electric power generated by the generator to the electromotive driving unit,
the control device in combination with the engine and the generator constituting a physically integrated unit that is mountable to and dismountable from the vehicle body, the control device configured to output a store visit promotion signal to an informing device while the physically integrated unit is mounted on the vehicle body, the informing device prompting a visit to a store where the physically integrated unit is replaceable,
the control device directing the electric power output unit to output electric power to the electromotive driving unit without interposition of a battery while the physically integrated unit is mounted on the vehicle body.
2. The vehicle according to claim 1, wherein
the control device outputs the store visit promotion signal at a time that is at least within a period during which the engine drives the generator so that the generator generates electric power.
3. The vehicle according to claim 2, wherein
the control device includes a detection unit that detects a functional abnormality of a component of the engine, and
the control device outputs the store visit promotion signal based on detection of the functional abnormality by the detection unit.
4. The vehicle according to claim 2, wherein
the physically integrated unit is provided with a fuel tank that supplies a liquid fuel to the engine, and
the control device outputs the store visit promotion signal based on an amount of liquid fuel in the fuel tank.
5. The vehicle according to claim 2, wherein
the control device outputs the store visit promotion signal based on history information of the physically integrated unit,
the history information includes at least one of total history information and section history information, the total history information being an accumulation from start of use of the physically integrated unit itself, the section history information being an accumulation from when the physically integrated unit is mounted on the vehicle body to when the physically integrated unit is dismounted from the vehicle body, and
the history information relates to at least one of values of: a cumulative elapsed time during which the physically integrated unit has been mounted on the vehicle body; a cumulative operating time of the engine; a cumulative number of rotations of the engine; a cumulative power generation of the generator; or a cumulative travel distance of the vehicle including the vehicle body with the physically integrated unit mounted thereon.

6. The vehicle according to claim 1, wherein
the control device includes a detection unit that detects a functional abnormality of a component of the engine, and
the control device outputs the store visit promotion signal based on detection of the functional abnormality by the detection unit.

7. The vehicle according to claim 6, wherein
the physically integrated unit is provided with a fuel tank that supplies a liquid fuel to the engine, and
the control device outputs the store visit promotion signal based on an amount of liquid fuel in the fuel tank.

8. The vehicle according to claim 6, wherein
the control device outputs the store visit promotion signal based on history information of the physically integrated unit,
the history information includes at least one of total history information and section history information, the total history information being an accumulation from start of use of the physically integrated unit itself, the section history information being an accumulation from when the physically integrated unit is mounted on the vehicle body to when the physically integrated unit is dismounted from the vehicle body, and
the history information relates to at least one of values of: a cumulative elapsed time during which the physically integrated unit has been mounted on the vehicle body; a cumulative operating time of the engine; a cumulative number of rotations of the engine; a cumulative power generation of the generator; or a cumulative travel distance of the vehicle including the vehicle body with the physically integrated unit mounted thereon.

9. The vehicle according to claim 1, wherein
the physically integrated unit is provided with a fuel tank that supplies a liquid fuel to the engine, and
the control device outputs the store visit promotion signal based on an amount of liquid fuel in the fuel tank.

10. The vehicle according to claim 9, wherein
the control device outputs the store visit promotion signal based on history information of the physically integrated unit,
the history information includes at least one of total history information and section history information, the total history information being an accumulation from start of use of the physically integrated unit itself, the section history information being an accumulation from when the physically integrated unit is mounted on the vehicle body to when the physically integrated unit is dismounted from the vehicle body, and
the history information relates to at least one of values of: a cumulative elapsed time during which the physically integrated unit has been mounted on the vehicle body; a cumulative operating time of the engine; a cumulative number of rotations of the engine; a cumulative power generation of the generator; or a cumulative travel distance of the vehicle including the vehicle body with the physically integrated unit mounted thereon.

11. The vehicle according to claim 1, wherein
the control device outputs the store visit promotion signal based on history information of the physically integrated unit,
the history information includes at least one of total history information and section history information, the total history information being an accumulation from start of use of the physically integrated unit itself, the section history information being an accumulation from when the physically integrated unit is mounted on the vehicle body to when the physically integrated unit is dismounted from the vehicle body, and
the history information relates to at least one of values of: a cumulative elapsed time during which the physically integrated unit has been mounted on the vehicle body; a cumulative operating time of the engine; a cumulative number of rotations of the engine; a cumulative power generation of the generator; or a cumulative travel distance of the vehicle including the vehicle body with the physically integrated unit mounted thereon.

12. An engine generator unit for driving a vehicle, comprising:
an engine, a generator, and a control device;
the engine, the generator, and the control device being configured to be mountable to and dismountable from a body of the vehicle as a physically integrated unit;
the control device including:
a power generation control unit that outputs a signal for controlling the engine and the generator;
an electric power output unit that outputs electric power generated by the generator; and
a store visit promotion signal output unit that outputs a store visit promotion signal to an informing device while the physically integrated unit is mounted on the vehicle body, the informing device prompting a visit to a store where the physically integrated unit is replaceable;
wherein:
the electric power output unit outputs the electric power to an electromotive driving unit mounted on the vehicle body without interposition of a battery while the physically integrated unit is mounted on the vehicle body.

* * * * *